(12) United States Patent
Messing et al.

(10) Patent No.: US 7,062,084 B2
(45) Date of Patent: *Jun. 13, 2006

(54) METHOD FOR IMAGE DESCRIPTION USING COLOR AND LOCAL SPATIAL INFORMATION

(75) Inventors: Dean Messing, Camas, WA (US); Petrus J. L. van Beek, Vancouver, WA (US); James Errico, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 852 days.

This patent is subject to a terminal disclaimer.

(21) Appl. No.: 09/729,470

(22) Filed: Dec. 4, 2000

(65) Prior Publication Data

US 2002/0106122 A1    Aug. 8, 2002

Related U.S. Application Data

(60) Provisional application No. 60/250,806, filed on Dec. 1, 2000.

(51) Int. Cl.
*G06K 9/00*    (2006.01)

(52) U.S. Cl. ...................... 382/165; 382/168
(58) Field of Classification Search ............... 382/162, 382/165, 168, 170, 205, 218, 224, 305
See application file for complete search history.

(56) References Cited

U.S. PATENT DOCUMENTS

| | | | |
|---|---|---|---|
| 4,979,225 A | 12/1990 | Tsujiuchi et al. | |
| 5,309,228 A | 5/1994 | Nakamura | |
| 5,446,543 A | 8/1995 | Nakagawa et al. | |
| 5,446,709 A | 8/1995 | Mukai | |
| 5,509,111 A | 4/1996 | Hong et al. | |
| 5,521,841 A | 5/1996 | Arman et al. | |
| 5,586,197 A | 12/1996 | Tsujimura et al. | |
| 5,652,881 A | 7/1997 | Takahashi et al. | |
| 5,751,286 A | 5/1998 | Barber et al. | |
| 6,026,411 A | 2/2000 | Delp | |
| 6,516,100 B1 * | 2/2003 | Qian | 382/305 |
| 6,542,632 B1 * | 4/2003 | Qian et al. | 382/165 |

OTHER PUBLICATIONS

Leszek Cieplinski; Sylvie Jeannin; Munchurl Kim; Jens-Rainer Ohm; Visual Working Draft 4.0 ISO/IEC JTC1/SC29WG11/W3522, Jul. 21, 2000, pp. 2-57, XP001010701; p. 27-30.

Qian R.J., et al.: "Image Retrieval Using Blob Histograms"; Multimedia and Expo, 2000. ICME 2000. W000 ieeee International Conference on New York, NY, USA; Jul. 30-Aug. 2, 2000; Piscataway, NJ, USA; IEEE us, Jul. 30, 2000, pp. 125-128, XPO 10511417; ISBN: 0-7803-6536-4; p. 125-p. 128; Figures 1,2; Table 1.

(Continued)

*Primary Examiner*—Phuoc Tran
(74) *Attorney, Agent, or Firm*—Chernoff, Vilhauer, McClung & Stenzel

(57) ABSTRACT

A technique for describing an image where a number of test areas are located on the image.

24 Claims, 20 Drawing Sheets

OTHER PUBLICATIONS

Tao Y, et al.: "Spatial Color Indexing: A Novel Approach for Content-based Image Retrieval"; Proceedings IEEE International Conference on Multimedia Computing and Systems, Florence, Italy, Jun. 7-11, 1999;pp. 530-535 vol. 1, SP002257495; 1999 Los Alamitos, CA, USA, IEEE, Comput. Soc., usa, isbn: 0-7695-0253-9; Abstract, p. 530, col. 1-p. 533, col. 1.

I. K. Sethi; I. Coman; B. Day; F. Jiang; 1-50 D. Li; "Color-Wise: A System for Image Similarity Retrieval Using Color". Proceedings of SPIE, Storage and Retrieval for Image and Video Datatbases VI, Jan. 28-30, 1998, pp. 140-149, XP008023093, California, USA, pp. 143-146.

*Results of CE CT3 on Color Structure Histogram Interoperability*, D. Messing, P. van Beek, I.Sezan; International Organization for Standardization ; Noordwijkerhout, the Netherlands, Mar. 2000.

\* cited by examiner

|  | S = X1 | S = X2 | S = X3 |
|---|---|---|---|
| $\mu_0$ | 0 | 0 | 0 |
| $\mu_1$ | 2 | 0 | 2 |
| $\mu_2$ | 1 | 4 | 2 |
| $\mu_3$ | 6 | 3 | 0 |
| $\mu_4$ | 5 | 0 | 0 |
| $\mu_5$ | 6 | 2 | 1 |
| $\mu_6$ | 3 | 0 | 0 |
| $\mu_7$ | 2 | 3 | 2 |
| $\mu_8$ | 0 | 1 | 0 |
| $\mu_9$ | 1 | 0 | 1 |
| $\mu_{10}$ | 0 | 0 | 0 |

FIG. 7

|  | 0% TO 4% | 4% TO 12% | 12% TO 26% | 26% TO 52% | 52% TO 100% |
|---|---|---|---|---|---|
| $\mu_0$ | 0.3 | 0.1 | 0.6 | 1.8 | 3.0 |
| $\mu_1$ | 1.5 | 0.3 | 0.7 | 0.9 | 0.0 |
| $\mu_2$ | 1.9 | 4.3 | 0.0 | 3.1 | 2.1 |
| $\mu_3$ | 0.0 | 0.0 | 3.9 | 2.1 | 1.7 |
| $\mu_4$ | 4.5 | 2.2 | 0.3 | 0.0 | 4.0 |
| $\mu_5$ | 0.0 | 0.1 | 0.0 | 0.0 | 0.0 |
| $\mu_6$ | 9.1 | 0.0 | 5.3 | 0.0 | 4.3 |
| $\mu_7$ | 0.0 | 10.2 | 9.3 | 6.7 | 6.1 |
| $\mu_8$ | 0.0 | 4.7 | 0.0 | 0.0 | 1.2 |
| $\mu_9$ | 0.0 | 0.0 | 0.3 | 0.1 | 0.0 |
| $\mu_{10}$ | 2.2 | 3.2 | 1.7 | 0.0 | 5.2 |

FIG. 8

| | 0% TO 4% | 4% TO 12% | 12% TO 26% | 26% TO 52% | 52% TO 100% |
|---|---|---|---|---|---|
| $\mu_0$ | 0.3 | 0.1 | 0.6 | 1.8 | 3.0 |
| $\mu_1$ | 1.5 | 0.3 | 0.7 | 0.9 | 0.0 |
| $\mu_2$ | 1.9 | 4.3 | 0.0 | 3.1 | 2.1 |
| $\mu_3$ | 0.0 | 0.0 | 3.9 | 2.1 | 1.7 |
| $\mu_4$ | 4.5 | 2.2 | 0.3 | 0.0 | 4.0 |
| $\mu_5$ | 0.0 | 0.1 | 0.0 | 0.0 | 0.0 |
| $\mu_6$ | 9.1 | 0.0 | 5.3 | 0.0 | 4.3 |
| $\mu_7$ | 0.0 | 10.2 | 9.3 | 6.7 | 6.1 |
| $\mu_8$ | 0.0 | 4.7 | 0.0 | 0.0 | 1.2 |
| $\mu_9$ | 0.0 | 0.0 | 0.3 | 0.1 | 0.0 |
| $\mu_{10}$ | 2.2 | 3.2 | 1.7 | 0.0 | 5.2 |

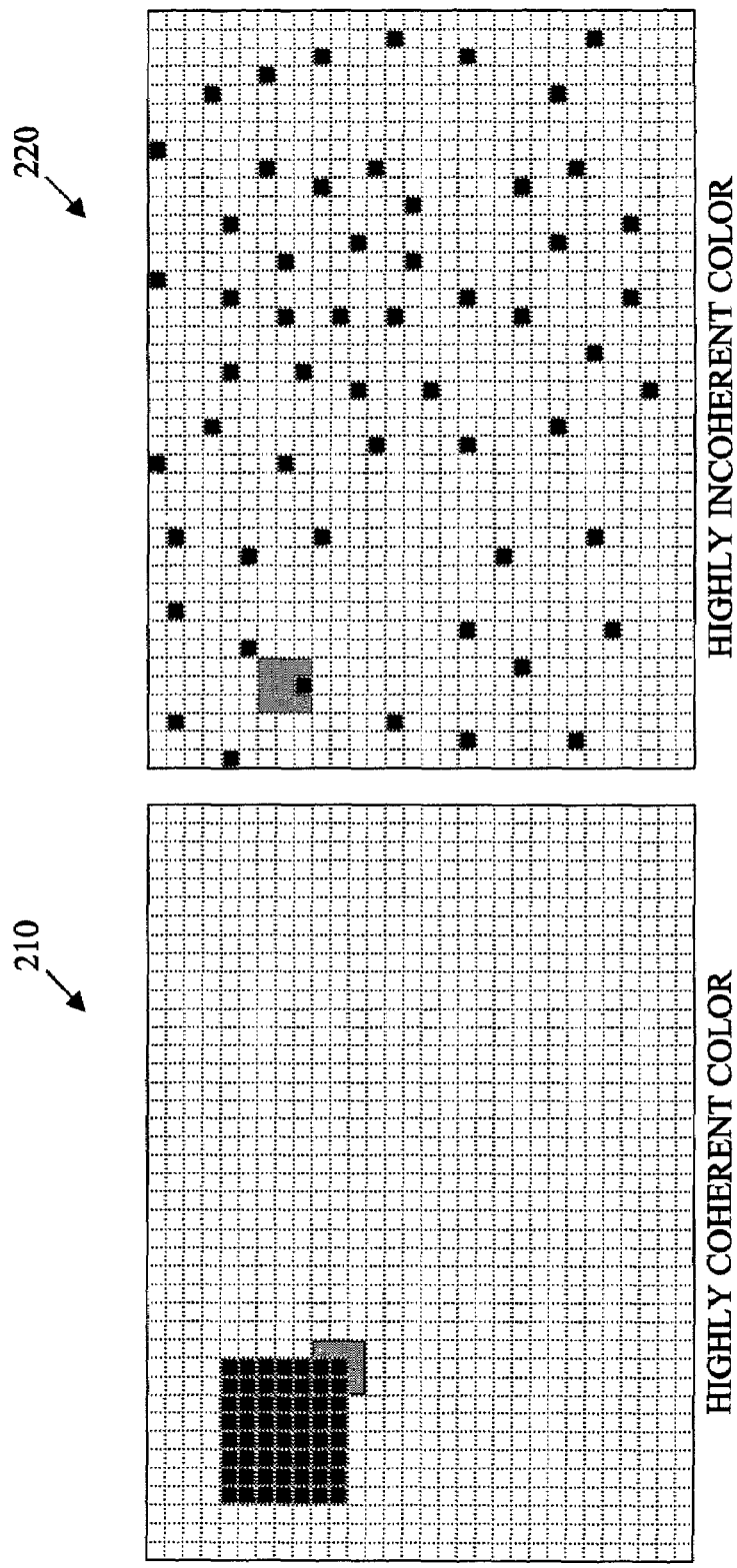
FIG. 12B HIGHLY INCOHERENT COLOR
FIG. 12A HIGHLY COHERENT COLOR

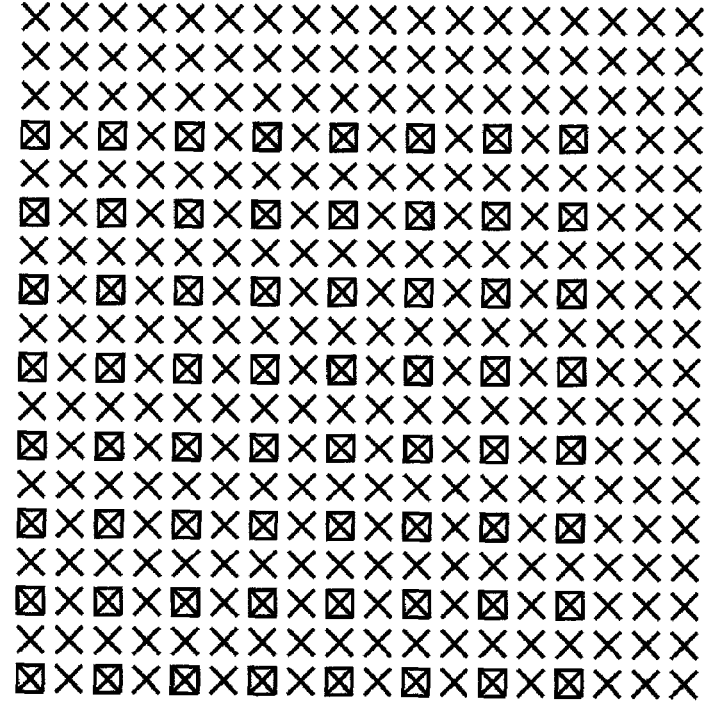

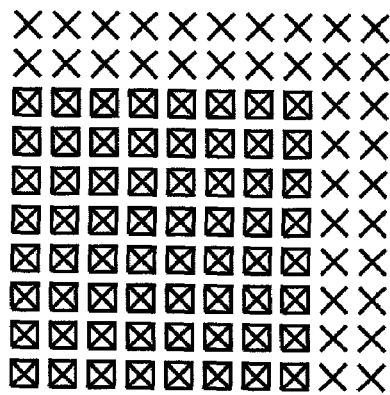

Structuring elements for images with different resolutions; the image in FIG. 13A is 320x240 and the image in FIG. 13B is 640x480 (only part of the image samples are shown). The diagram shows the structuring element in the initial location at the upper left corner of the image. The structuring element slides over the image and is shifted by 1 pixel in FIG. 13A and by 2 pixels in FIG. 13B. FIG. 13B corresponds to subsampling of the image by 2 in both directions and subsequently applying the same 8x8 structuring element.

| colorQuant | number of values |
|---|---|
| 000 | forbidden |
| 001 | 32 (HMMD) |
| 010 | 64 (HMMD) |
| 011 | 128 (HMMD) |
| 100 | 256 (HMMD) |
| 101-111 | reserved |

| ColorSpaceType | Component1 | Component2 | Component3 | Component4 | Component5 |
|---|---|---|---|---|---|
| RGB | R | G | B | N/A | N/A |
| YCbCr | Y | Cb | Cr | N/A | N/A |
| HSV | H | S | V | N/A | N/A |
| HMMD | Hue | Max | Min | Diff | Sum |
| LinearMatrix | C1 | C2 | C3 | N/A | N/A |
| Monochrome | Y | N/A | N/A | N/A | N/A |

FIG. 19

| Meaning | ColorSpaceType |
|---|---|
| RGB | 000 |
| YCbCr | 001 |
| HSV | 010 |
| HMMD | 011 |
| LinearMatrix | 100 |
| Monochrome | 101 |
| Reserved | 110-1111 |

FIG. 20

METHOD FOR IMAGE DESCRIPTION USING COLOR AND LOCAL SPATIAL INFORMATION

CROSS-REFERENCE TO RELATED APPLICATIONS

This application claims the benefit of U.S. Provisional Application No. 60/250,806, filed Dec. 1, 2000.

BACKGROUND OF THE INVENTION

The present invention relates to a method for describing an image based on the color content of the image.

Image description is a process for describing an image based upon the outcomes of the application of preselected measures to the image. Image description is useful in a number of applications such as digital image libraries where the descriptors are used as a basis for image indexing and retrieval. For image description to be practical and effective the outcome of the application of the measures to the image should be: (1) sufficient to distinguish between different images, (2) invariant to certain types of transformations of the image, (3) insensitive to noise, (4) easy to compute and (5) compact. Various methods of image description have been used and proposed with resulting image descriptors exhibiting these attributes to differing degrees.

A paper by Swain et al. entitled COLOR INDEXING describes the use of color histograms to describe images. A color histogram of an image is obtained by calculating the frequency distribution of picture elements or pixels as a function of pixel color. Color histograms are invariant to translation or rotation of the image about the viewing axis. Color histograms can differ markedly for images with differing features. However, all spatial information about the features in the image is discarded in the creation of the color histogram. Therefore as long as two images have the same number of picture elements of each color it is not possible to distinguish between them using color histograms. This is true even if the two images contain features of completely different size or shape. For example, the total areas of the like colored (like hatched) geometric features of the two images of FIG. 1A and FIG. 1B are equal and require the same number of picture elements. The images cannot be distinguished on the basis of their color histograms even though the features are clearly very different in size and number, and the images are easily distinguishable by the human eye.

Several methods have been proposed to improve different aspects of the performance of color histograms. Stricker et al. in the paper entitled SIMILARITY OF COLOR IMAGES proposed the use of color moments. Color moments are statistical measures of the shape and position of the population distribution of pixel colors. In particular the color moments include a mean, a standard deviation and a skewness. Expressing the information contained in the color histogram in terms of a color moment results in a very compact image descriptor. Funt et al. in the paper entitled COLOR CONSTANT COLOR INDEXING proposed using the ratios of color triples [the red, the green and the blue pixels (RGB)] from neighboring regions of an image to reduce the effects of intensity variations. Rubner et al. in the paper entitled NAVIGATING THROUGH A SPACE OF COLOR IMAGES proposed the use of color signatures which is a plot of clusters of similar colors in an RGB color space. Using color signatures reduces the amount of data necessary to describe an image compared to that required for a color histogram. These methods improve some aspects of the performance of the image descriptors over the color histogram. However, like the color histogram, no spatial information is preserved.

Several processes have been proposed which attempt to preserve some of the spatial information that is discarded in the construction of a color histogram. Pass et.al in the paper entitled HISTOGRAM REFINEMENT FOR CONTENT BASED IMAGE RETRIEVAL proposed refining the color histogram with color coherence vectors. In this process the coherence of the color of a picture element in relation to that of other picture elements in a contiguous region is determined. Even though the number of picture elements of each color is equal and, therefore, the color histograms are identical for two images, differences between features in the images will mean that the numbers of picture elements of each color which are color coherent will vary. Color coherence vectors do embed some spatial information in the descriptors. Unfortunately, they require at least twice as much additional storage space as a traditional histogram.

Rickman et al. in the paper entitled CONTENT-BASED IMAGE RETRIEVAL USING COLOUR TUPLE HISTOGRAMS proposed image description by construction of a histogram of the color hue at the vertices of randomly located triangular color tuples. Since the vertices of the triangular tuples are spaced apart, some spatial information is retained. Unfortunately, it is difficult to determine the dominant color of an image from the color tuple data. Further, the retained spatial information is difficult to interpret in a normal sense, therefore making it difficult to use the information for indexing an image database.

"Color correlograms" were proposed for image description by Huang et al. in the paper entitled IMAGE INDEXING USING COLOR CORRELOGRAMS. A color correlogram quantifies the probability that a pixel of a particular color will lie at a specified radial distance from a pixel of a particular color in the image. The color correlogram provides a technique of measuring color coherence at different scales or distances from a point on the image. However, it is difficult to determine the dominant color of the image from a correlogram and it is difficult to interpret the correlogram in any usual human sense.

Smith et al. in the paper entitled QUERYING BY COLOR REGIONS USING THE VISUALSEEK CONTENT-BASED VISUAL QUERY SYSTEM describe a method of image description using regions of color. Color data is transformed and the colors of the image are quantized and then filtered to emphasize prominent color regions. "Color set" values are extracted and a histogram is approximated by retaining those color set values above a threshold level. This method of image description requires image segmentation, a process that is difficult and computationally intensive. The region representation is rigid and variant to rotation or translation of images.

"Blobworld" is a method of image representation proposed by Carson et al. in the paper entitled REGION-BASED IMAGE QUERYING. In this method the image is segmented into a set of localized coherent regions of color and texture, known as "blobs." The "blobworld" representation of the image is the result of recording the location, size, and color of the segmented color blobs. This method provides considerable spatial information about the image, but the "blobworld" representation is rigid and variant to rotation or translation or images. Further, the image segmentation process is difficult and requires substantial computational resources.

BRIEF DESCRIPTION OF THE DRAWINGS

FIG. 7 is an exemplary illustration of the resulting image data for a first aspect of the present invention.

FIG. 8 is an exemplary illustration of the resulting image data for a second aspect of the present invention.

FIG. 12A illustrates an image with highly coherent color.

FIG. 12B illustrates an image with highly incoherent color.

FIG. 13A illustrates an image with an 8×8 structuring element at single spacing.

FIG. 13B illustrates an image with an 8×8 structuring element at double spacing.

FIG. 19 shows an exemplary selection of available color spaces.

FIG. 20 shows an exemplary order of the color spaces of FIG. 19.

DETAILED DESCRIPTION OF THE PREFERRED EMBODIMENTS

In existing systems of image description, the color or texture is quantified for a plurality of areas of predefined size and shape. The areas are preferable located on the image according to a predefined plan. The color or textural data for these areas of the image or statistical data related thereto obtained are useful in describing the image and in distinguishing between images. The data obtained from each image may be referred to as an image descriptor.

Figure 1A:
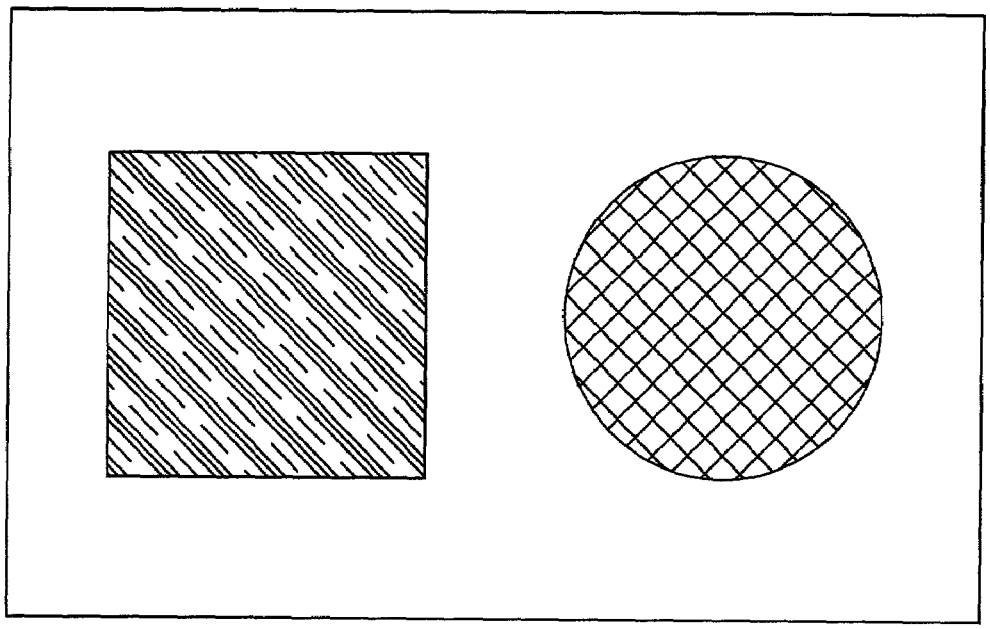
FIGS. 1A and 1B illustrate two images with features of different scale.
Figure 1B:
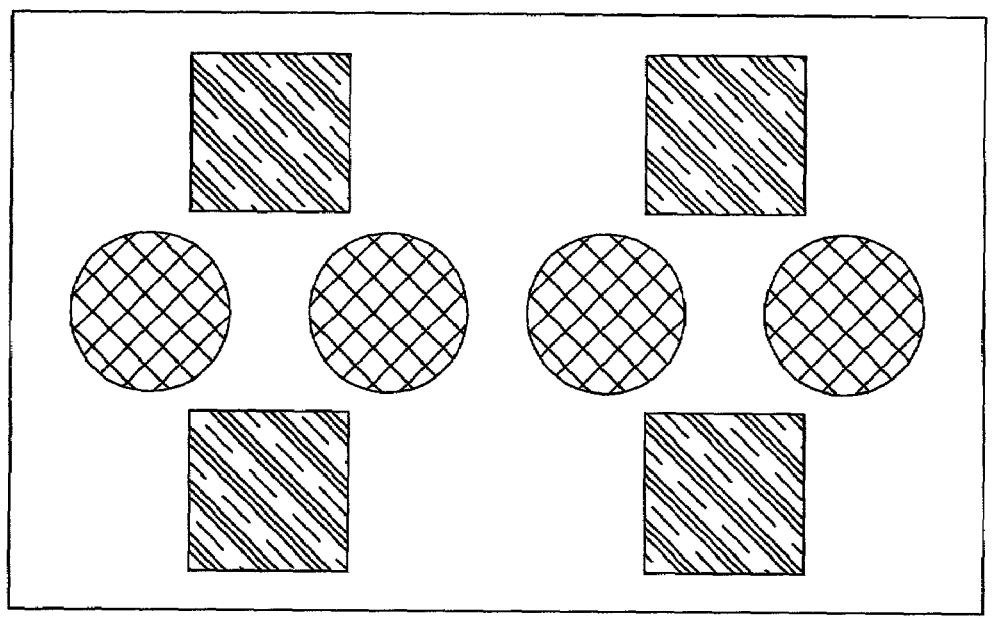
Figure 2:
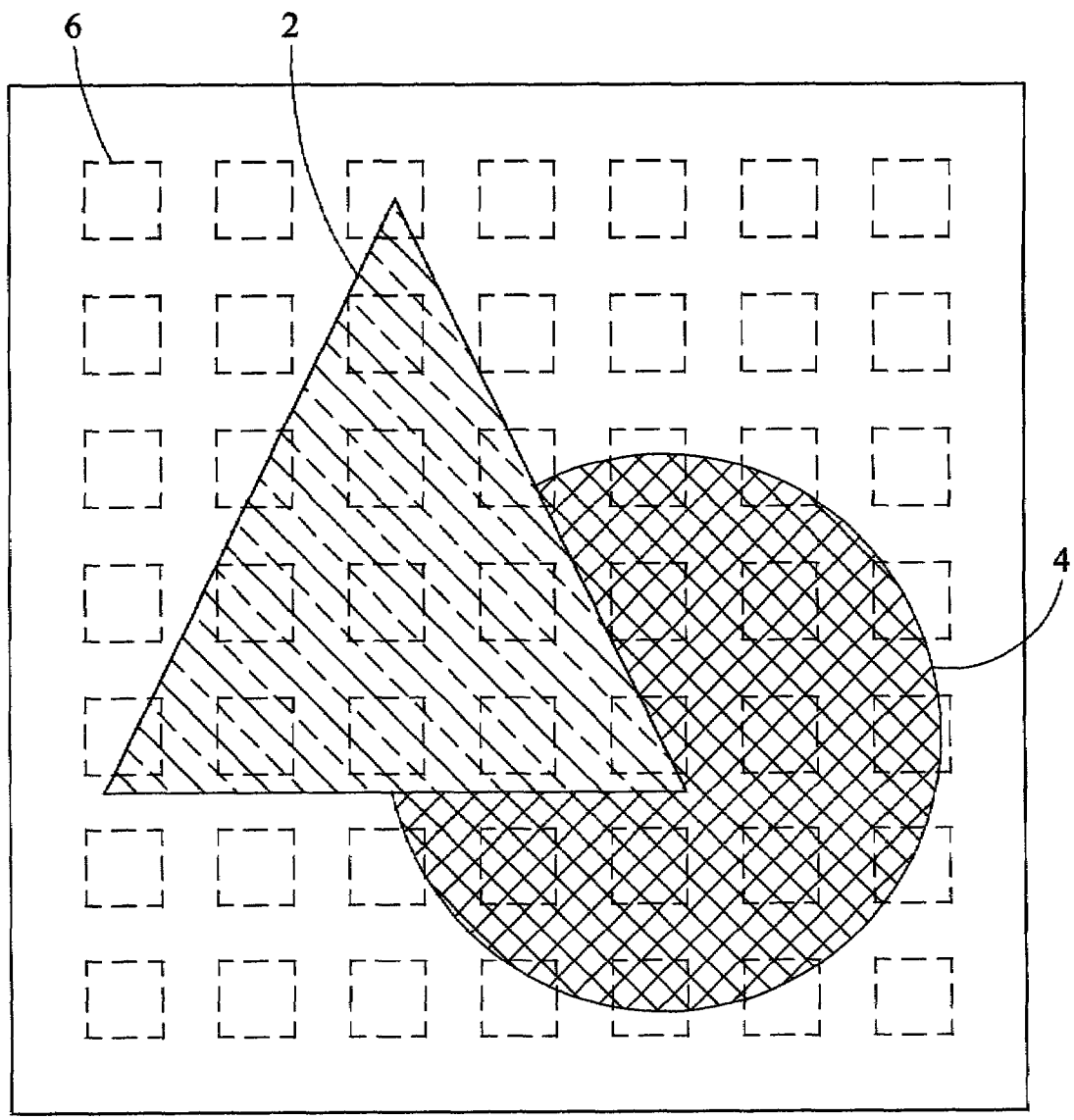
FIG. 2 illustrates an image containing features of different colors or textures with delineated test areas.

FIG. 2 illustrates the general application of image description using a generalized color histogram descriptor (characterization) based on an image having a triangular feature 2 of a first color and a circular feature 4 of a second color. The color of the remainder of the image is a third background color. A number of square test areas 6 have been delineated on the image. The size and shape of the test areas may correspond to the size and shape of a predefined spatial structuring element encompassing a plurality of picture elements or pixels. While the spatial structural element defining the test areas illustrated in FIG. 2 is a square, there are no restrictions on the shape or size of the element. Regular shapes such as rectangles or circles may be more convenient in many applications than an amorphous shape or "blob." Also, the test area may be a scattered pattern of picture elements or pixels, akin to a shotgun blast. Likewise, the plan for locating the test areas on the image is not restricted to the rectilinear pattern illustrated in FIG. 2.

A number of the test areas 6 of FIG. 2 lie wholly within the triangular feature 2. The color of the image in these test areas is the homogenous first color. Likewise, a number of test areas lie wholly within the circular feature 4 or the background. Over these test areas the image color is homogenous and can be quantified as either the second color or the background color, respectively. To varying degrees the remaining test windows overlap two or more regions of color. The colors in these areas are not homogeneous.

Like the shape of the test areas and the plan for locating test areas, the size of the test area may be modified. Spatial information about the image is embedded in the data or image descriptor because the test areas have scale, that is, the areas encompass a plurality of picture elements. As can be seen by comparing FIGS. 2 and 3 changing the scale of the test area changes the number of test areas of each color.

Figure 4:
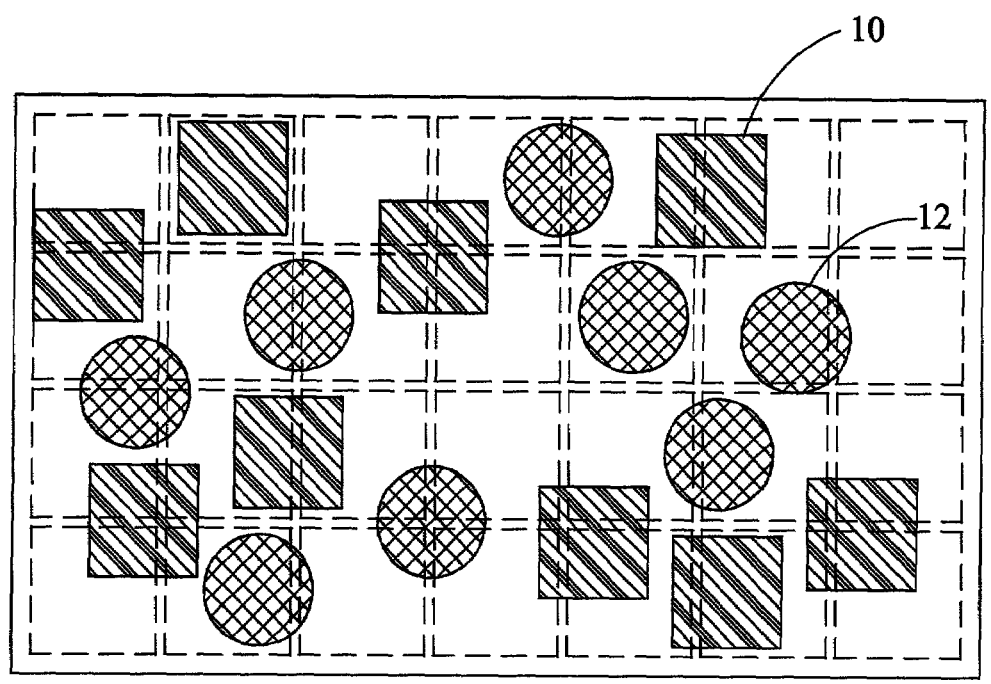
FIG. 4 is an image for description with four square and four circular features.
Figure 5:
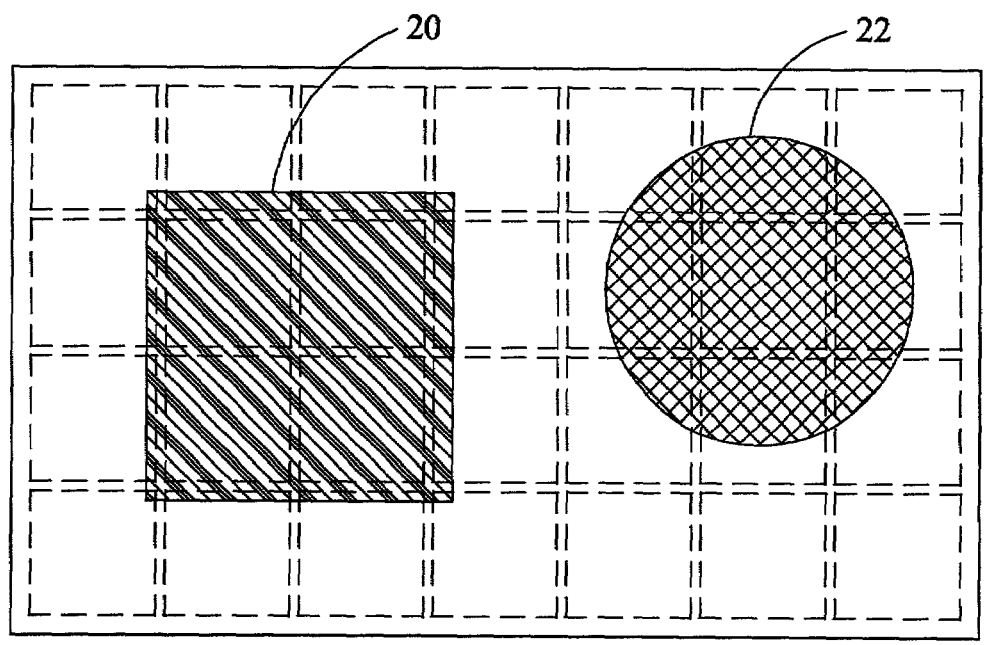
FIG. 5 is an image for description with a single square feature and a single circular feature where each feature has an area equal to the four features of the same geometric shape in FIG. 4.

Likewise if the sizes of the individual color regions of two images differ, the number of test areas of each color will likely vary. For example, the total areas of the four square 10 and circular 12 features of the image of FIG. 4 are equal to those of the square 20 and circular 22 features of the image of FIG. 5. As a result, the distribution of the population of picture elements as a function of color would be identical for the two images. However, as a result of the differences in sizes of the individual color regions of the images the number of test areas of each homogeneous color varies when the scale of the test area is held constant. In FIG. 5 there are more test areas that are the color of the circular feature than the test areas of FIG. 4 that lie wholly within the circular features. An image containing large uniform color regions or "blobs" will produce more test areas with the homogeneous color of those blobs than an image with smaller more scattered regions of color.

While some test areas may lie completely within a region of homogeneous color, several of the test areas of FIG. 2 overlap two or more color regions. As a result the colors in these test areas are not homogeneous and must be quantified in some way to be useful in describing the image. For example, the mean values of the individual red, green, and blue (RGB) pixels, a transform of the RGB pixel values, or the mean color or the vector sum of the RGB intensity values might be used to describe the color of a test area of heterogeneous color. Since each test area having a heterogeneous color is likely to overlap two or more color regions to a degree differing from that of any other test area, there are likely to be as many mean colors or combinations of pixel intensities as there are test areas of heterogeneous color. Mapping the possible input values into a smaller number of quantized levels may be used to reduce the number of colors. For example, the RGB color data might be represented as the population of test areas in which percentage contributions of the red, green, and blue colors lie within certain ranges.

Figure 3:
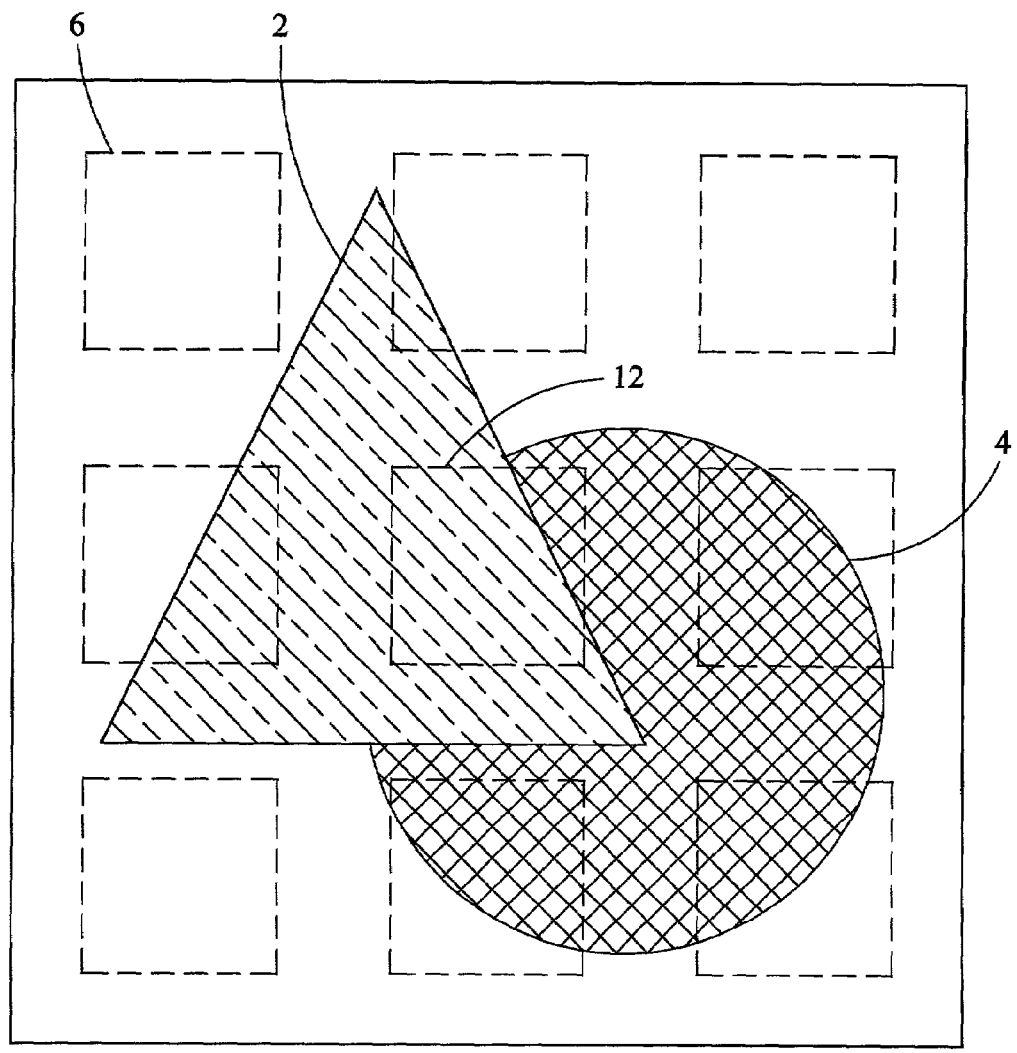
FIG. 3 illustrates the image of FIG. 2 with test areas of larger scale delineated on the image.

As can be seen in FIGS. 2 and 3, only a small number of test areas may fall completely within the bounds of an image feature and, therefore, have truly homogenous color. However, in several cases (see FIG. 2) a substantial part (less than all) of a test area is a particular color. The number of test areas included in the set of areas with homogeneous color can be increased by including in the application a test of homogeneity that would include in the data areas of "substantial" homogeneity. Likewise, accepting regions of images which are substantially homogeneous may be necessary for images which do not include many homogeneous color regions.

For example, a test of homogeneity can be based on the standard deviation of colors of the picture elements in the test area. If $\sigma_k$ is the standard deviation of the pixel values in color channel K within a test area $\epsilon$ then homegeneity can be defined by:

$$H(\varepsilon) = 1 - \sum_k w_k \sigma_k$$

where $W_K$ is the weight coefficient for color channel K.

An alternative homogeneity test function can be based on principle component analysis. A matrix A is defined as $A=(P_{ij})_{M \times N}$ where $P_{ij}$ is the jth color component of ith pixel within a test are $\epsilon$. The singular values of A are determined by singular value decomposition. Letting $P_k$, where $K=1,2,\ldots$, denote the singular values of A in descending order of magnitude, then homogeneity can be defined as:

$$H(\varepsilon) = 1 - \sum_{k>1} w_k \rho_k / \rho_l$$

where $W_k$ is the weight coefficient corresponding to singular value $P_k, K>1$.

Data produced by the application of the image description can be incorporated into statistical representations which are familiar in the field. A "color blob" histogram can be constructed to present the frequency distribution of the population of test areas as a function of their color. For a given image I a color blob histogram is the population distribution of all test areas of scale s, where s is the size of the test area in picture elements. The color blob histogram is defined as an array $h_s$ that has an element $h_{s,c}$ for each quantized color c belonging to the set C, that is $C \in C$, and:

$$h_{s,c} = |\{\epsilon \subset \blacksquare_s | C(\epsilon) = C\}|,$$

where C is the set of all quantified colors and $\blacksquare_s$ is the set of all color blobs of size S in the image $\blacksquare$.

The population distribution of test areas as a function of color can also be described by color blob moments which are the statistical moments of the color blob histogram. The color blob moments are extremely compact image descriptors. For a given image I, the first, second, and third statistical moments of the population distribution of the test areas of size s in each color channel k are:

the mean ($\mu$) (first moment):

$$\mu_{s,k} = \frac{1}{|I_s|} \sum_{\varepsilon \in I_s} c_k(\varepsilon)$$

the standard deviation ($\sigma$) (second moment):

$$\sigma_{s,k} = \frac{1}{|I_s|} \sum_{\varepsilon \in I_s} (c_k(\varepsilon) - \mu_{s,k})^2)^{1/2}$$

the skew ($\lambda$) (third moment):

$$\lambda_{s,k} = \frac{1}{|I_s|} \sum_{\varepsilon \in I_s} (c_k(\varepsilon) - \mu_{s,k})^3)^{1/3}$$

where: $C_k(\epsilon)$ is the kth color component of $C(\epsilon)$.

Referring to FIG. 7, the data resulting from a processed image may be represented as a set of quantized colors, $\mu_0$–$\mu_{10}$, together with an indication of the number of test areas of sizes S having a sufficiently homogeneous color matching one of the quantized colors. In other words, if $\mu_5$ is red and six test areas of size X1 are sufficiently homogeneously red then $\mu_5$, the entry for $\mu_5$ and S=X1, would have a total of six. The result is a histogram where each of the entries totals the number of test areas of size X1 having sufficiently homogeneous colors, as opposed to the summation of the colors of the individual pixels. The image may be processed with different test area sizes, S, to provide additional data. The resulting data from many images may be used for image comparison purposes.

Figure 6A:
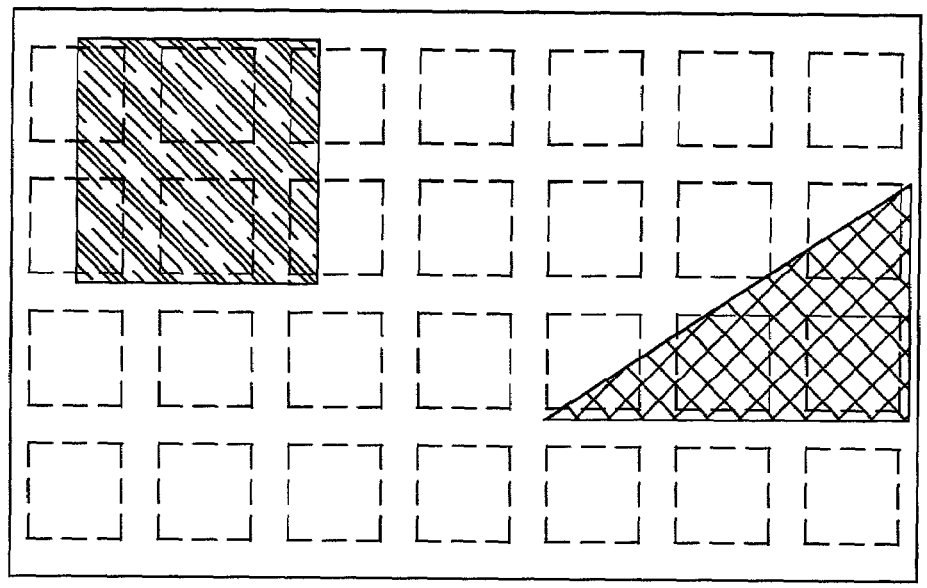
FIGS. 6A and 6B illustrate two similar images having features of the same size and shape but which have been translated and rotated.
Figure 6B:
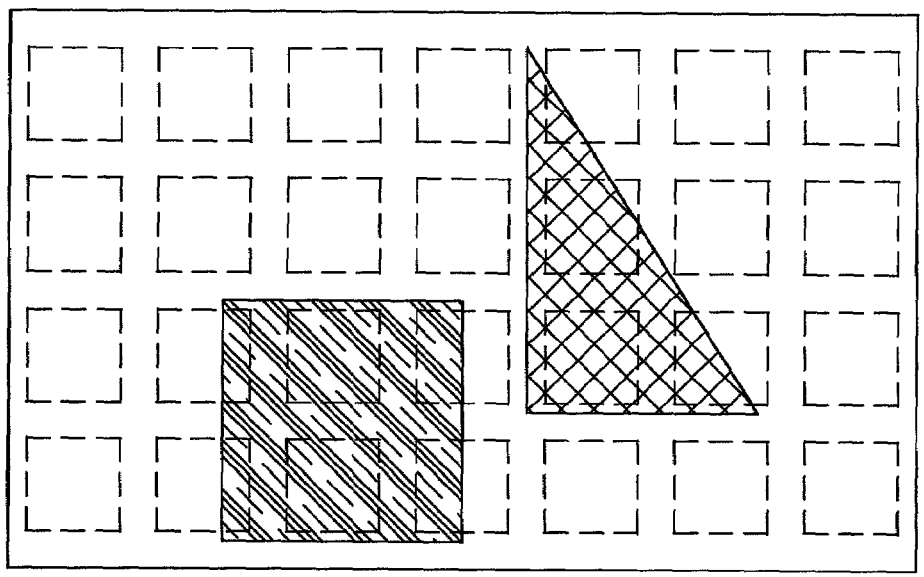

Image description using spatial test areas may result invariance to rotation or translation of image features. In the two images in FIG. 6 the square feature is translated vertically and horizontally while the triangular feature is rotated ninety degrees. The number of test areas having the homogeneous color of each of these features is unchanged. It can be shown for isotropic color areas that the color blob histograms and color blob moments are invariant to translation or rotation of image features.

The system may describe images on the basis of their texture or surface appearance. While color is a point property and can be described by color histograms or other representations of the color properties of picture elements, texture is a local neighborhood property and texture descriptors describe the properties of an area surrounding a picture element. The texture of the individual test areas can be expressed in terms of mean texture descriptors, such as anisotropy, orientation, and contrast. The texture descriptors can be statistically described by a texture blob histogram. For an image I, a texture blob histogram for test areas containing s picture elements is the population distribution of test areas of size s, defined as an array $h_s$ that has an element $h_{s,t}$ for each quantized texture model t contained in T and $$h_{s,t} = |\{\epsilon \subset I_s | t(\epsilon) = t\}|$$

where T is the set containing all quantized texture models.

For a given image I, the texture blob moments for test areas of scale s are the first, second, and third statistical moments of the frequency distribution of the test areas of size s in each texture band k, that is:

the mean (μ) (first moment):

$$\mu_{sk} = \frac{1}{|I_s|} \sum_{\epsilon \in I_s} t_k(\epsilon)$$

the standard deviation (σ) (second moment):

$$\sigma_{sk} = \left(\frac{1}{|I_s|} \sum_{\epsilon \in I_s} (t_k(\epsilon) - \mu_{sk})^2\right)^{1/2}$$

the skew (λ) (third moment):

$$\lambda_{sk} = \left(\frac{1}{|I_s|} \sum_{\epsilon \in I_s} (t_k(\epsilon) - \mu_{sk})^3\right)^{1/3}$$

where $t_k(\epsilon)$ is the kth component of $t(\epsilon)$.

The aforementioned technique counts the total number of test areas that are sufficiently homogeneous based upon the standard deviation of the color or texture. Unfortunately, selection of the threshold value for the standard deviation is difficult. If the threshold value is zero then no test area will likely be sufficiently homogeneous. Alternatively, if the threshold value is large then many of the test areas will likely be not very homogeneous, yet still be counted. FIG. 8 illustrates the percentage color distribution for the quantized colors for each test area. The resulting matrix has the number of occurrences of each quantized color as a function of color and color percentage. It is noted that the 100 percent column in FIG. 8 is the same as a single column of the aformentioned technique shown in FIG. 7.

Referring again to FIGS. 2–5, the description of the technique is illustrated for matters of convenience as a set of test areas spaced apart from one another. To increase the invariance to translation and rotation the technique may involve locating the test area in an overlapping fashion at each pixel within the image.

The size of the test area can have a profound effect on the number of sufficiently homogeneous test areas. Referring to FIGS. 4 and 5, if the test area used was selected to be larger than the square and circular features 10 and 12 (FIG. 4) but less than the square and circular features 20 and 22 (FIG. 5), then processing FIG. 4 may result in no sufficiently homogeneous regions. However, processing FIG. 5 would result in several sufficiently homogeneous regions. In this manner the difference in the number of sufficiently homogenous test regions would be increased which would allow for easier differentiation between images using such measures.

The technique described herein is applicable to any suitable color space, such Y/Cb/Cr. The pattern and size of the test areas on the images may be changed or be random, if desired.

Figures 9, 10:
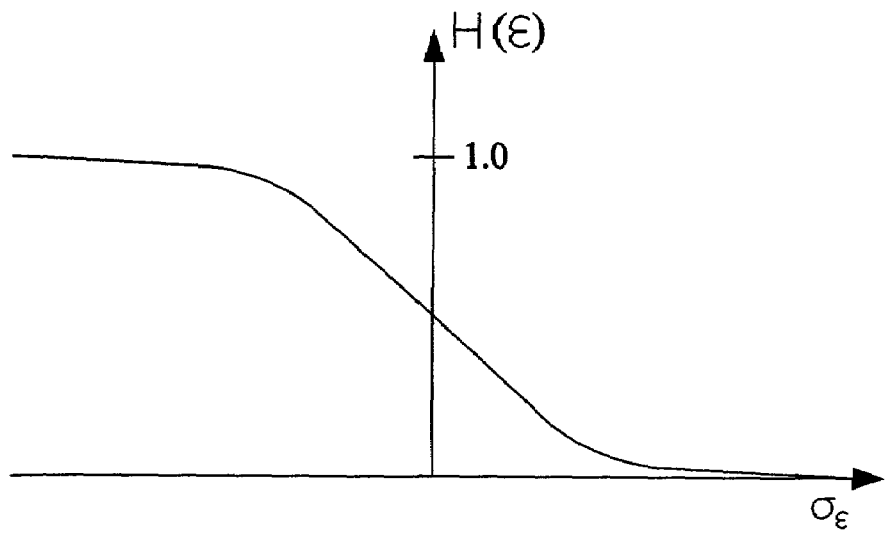
FIG. 9 is a graph of a nonbinary thresholding technique.
FIG. 10 is an exemplary illustration of the resulting image data for a third aspect of the present invention.

The aforementioned homogeneity test provides a result that is either sufficiently homogenous (yes or "1") or not sufficiently homogenous (no or "0"), in a manner similar to a step function. Such a homogeneity test is sensitive to noise because slight variations in the standard deviation, which is a calculated quantity, may change the result of the homogeneity test if the standard deviation is close to the threshold. Accordingly, the aforementioned homogeneity test is sensitive to noise and doesn't take into account finer gradations in the amount of homogeneity. Referring to FIG. 9, the homogeneity threshold determination may include a "soft" thresholding mechanism. The thresholding mechanism provides a floating point measure (e.g., not a binary yes/no determination) of the homogeneity in reference to some measure of the homogeneity, such as the standard deviation. The thresholding mechanism may provide a gradual increase in the homogeneity as the standard deviation, in a region proximate the threshold, will not result in significant changes in the measure of the homogeneity. In addition, the particular selection of the threshold value is less critical to achieving accurate results. Other non-binary functional definitions of the homogeneity as a function of some measuring criteria may likewise be used, if desired.

Referring again to FIG. 8, the percentage color distribution for the quantized colors for each test area is illustrated based on an equal percentage distribution for each column. However most images contain a large variety of color content in most regions of the image. Accordingly, the color distributions for most images tend to be distributed toward the smaller percentages. In other words, typical images contain relatively few large regions of substantially pure homogenous color. With relatively few significant regions of homogenous color, the portions of the matrix with larger percentage values tend to be primarily zero which wastes space and does not provide an effective technique of discriminating between real world images that contain smaller differences. Referring to FIG. 10, to overcome these limitations and to maintain a relatively compact matrix, the matrix may include smaller percentage ranges at the smaller percentages, with increasing percentage ranges toward the larger percentages. This maintains a small matrix, which is suitable for embedded systems, while providing more accurate discrimination between images with similar color content.

It is to be understood that the aforementioned description regarding a "soft" thresholding technique and modified matrix is likewise applicable for texture.

The present inventors considered the aforementioned techniques and realized that the selection of the percentages, such as shown on FIGS. 8 and 10, is at least partially arbitrary. In addition to being arbitrary, if the selection of quantized colors ($\mu_x$), if the percentages are finely spaced then slight differences in the amounts of colors will result in substantial differences in the resulting image descriptors. As it may be observed, it becomes increasingly more difficult to accurately compare different image descriptors derived from different but visually similar images because of the susceptibility to variances in the image descriptors themselves.

Figure 11:
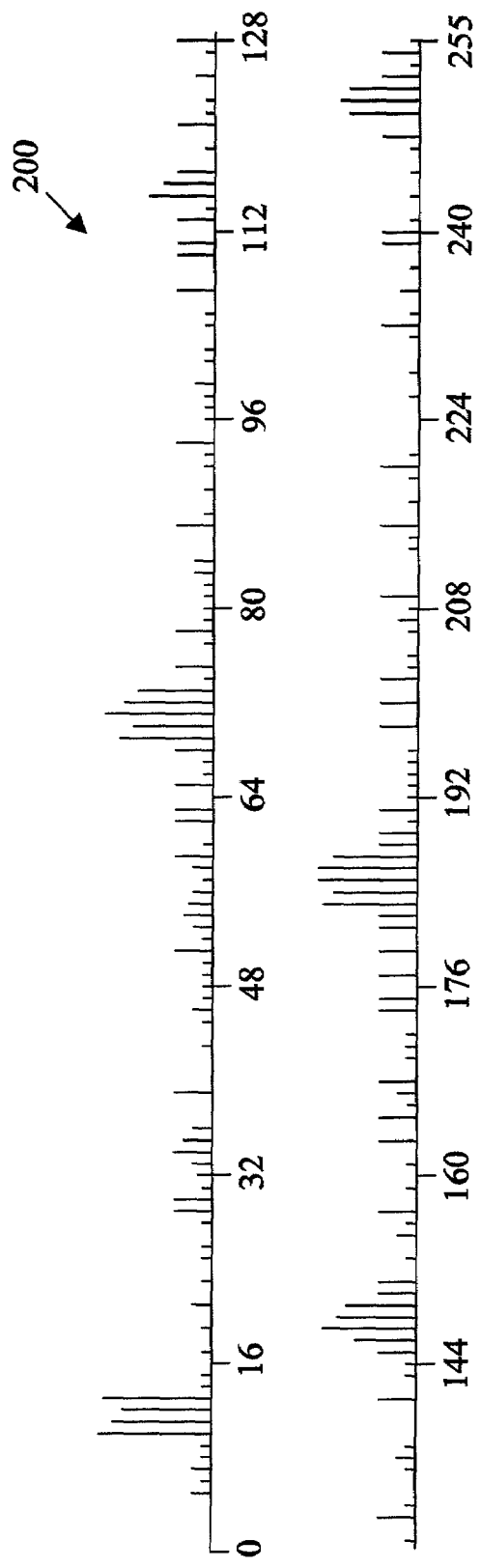
FIG. 11 is an exemplary color structure histogram.

In contrast to attempting to further refine the percentages and available quantized colors, the present inventors postulated that if the percentage boundaries, as shown in FIGS. 8 and 10, are eliminated and the homogeneity test is simplified so that it merely determines if any of the quantized colors exist within the test areas, then a robust and readily usable image descriptor is achievable. Referring to FIG. 11, the indicies (e.g. 0–255) along the axis represent a quantized color in the chosen color space, thereby forming a color structure histogram. To create the color structure histogram each different color contained in the image within each test area (or a selected set thereof) is identified. Then each different identified color is quantized according to the quantized color regions. The duplicate quantized colors are discarded for each test area. In other words, each quantized color in the test region of the image for each test area is counted merely once. The resulting color structure histogram is a one-dimensional histogram with the data contained therein representing more than merely the total color distribution of the image. The additional information contained in the resulting color structure histogram includes, for example, the frequency of the colors and the color coherence of each quantized color (spatial information). In essence, the system de-emphasizes the effect of spatial regions of coherent color in the histogram and emphasizes the effect of spatially incoherent regions of colors in the histogram. Referring to FIGS. 12A and 12B, the color histogram can distinguish between two images in which a given color is present in identical amounts but where the structure of the groups of pixels having the color is different in the two images. For example, FIG. 12A would record a value of 90 (9×10) for the color in the histogram. In contrast FIG. 12B would record a value of 459 (nine for each interior color (9×45), three for each edge color (3×4), and six for each color one away from the edge (7×6)) for the color in the histogram. A comparison between a traditional color histogram, illustrating the benefits, is described in ISO/IEC JTC 1/SC 29WG 11/M5572, Maui Hi., December 1999, incorporated by reference herein.

A DDL representation syntax for the color structure may be defined as follows:

n), where n is the number of pixels in the image. Assuming color quantization is performed prior to histogram extraction, only inter summations, multiplications, comparisons, and memory read/writes are needed to compute the color structure histogram.

If the number of bins in the histogram is n, then the order of complexity of histogram matching O(n), in cases when $l_1$ distance is used as a similarity measure, where $l_1$ refers to an $l_1$ norm (sum of the absolute differences). If the $l_1$ distance is used, only integer summation, comparison operations, and memory read/writes are needed to match two color structure histograms.

After further consideration of the test areas an attempt was made to determine the optimal size of a test region. It is to be understood that the optimal test size determination may likewise be used for other types of histograms that incorporate spatial information. It is problematic to determine an optimal test size with respect to retrieval accuracy for the structuring element. One of the difficulties is that a fixed size structuring element is not optimal for all images. After processing two different images representing the same scene at different scales using the same sized test area the present inventors were surprised to observe that the resulting color structure histograms, normalized to take account of the differing image sizes, were very different. This would not be the case with the traditional histogram. After observing this unexpected result, the present inventors then postulated that the primary source of the difference were the different scales of the two images. Based upon these postulations and observations, the present inventors then determined that the size of the test area (or equivalently the structuring element) should be modified in accordance with the size of the image

```
<complexType name="ColorStructureType">
    <complexContent>
        <extension base="VisualDType">
            <sequence minOccurs="1" maxOccurs="1">
                <element name="Values" minOccurs="1" maxOccurs="1">
                    <simpleType>
                        <list itemType="unsigned8">
                            <minLength value="3/32"/>
                            <maxLength value="256"/>
                        </list>
                    </simpleType>
                </element>
            </sequence>
            <attribute name="colorQuant" type="mpeg7:unsigned3" use"required"/>
        </extension>
    </complexContent>
</complexType>.
```

The retrieval effectiveness of the color structure histogram is significantly better than that of the traditional histogram, for descriptors of the same number of "bins" (i.e., number of quantized colors). The color structure histogram is particularly effective in comparison to the traditional histogram when descriptors with a small number of bins are compared, i.e., the case of coarse color quantization.

The extraction complexity of the color structure histogram is as follows. If K is the number of quantized colors in the histogram, and S is the number of pixels in the structuring element, then the order of complexity is O(S+K) per pixel, where O ( ) generally refers to the order of computational complexity operator, well known in the art as so-called big "O" or "Landau" notation. The complexity of computing the histogram over the entire image is O((S+K)

being processed. Accordingly, a relatively larger image should use a relatively larger test area, whereas a smaller image should use a relatively smaller test area.

An analysis of a database of images with approximately the same size (e.g., 320×240 and 352×288) using structuring elements (test areas) of different sizes, different pixel densities, and different layout patterns of positions within the image was performed. The structuring elements used were 1×1, 2×2, 4×4, 8×8, and 16×16. The 1×1 structuring element is a special case which is equivalent to extracting a traditional color histogram. The test result suggest that the retrieval performance generally improves with increasing structuring element size (having a given pixel density and given layout pattern). Significant performance improvements may be observed when increasing the structuring element size from 1×1 (regular histogram to 2×2, and to 4×4, and to 8×8. In many cases, the performance improvement becomes small when increasing the structuring element further. The sensitivity of the performance to the size of the structuring element is relatively low (i.e., there is no clear performance "peak" for a particular structuring element size). The exact structuring element size (within a few pixels) does not appear to be critical, with an 8×8 structuring element appearing to be preferable. Improvement was observed when the structuring element was increased by factors of two. After consideration of the retrieval accuracy data resulting from the database analysis, the present inventors determined that it is not necessary to precisely relate the structuring element size to the image, but rather it is sufficient to use factors of two which allows a straightforward logarithmic-exponential relationship and limits computational complexity.

While any technique may be used to modify the relative size of the structuring element, the preferred technique is described below. Referring to FIGS. 13A and 13B, the spatial extent of the structuring element should depend on the image size; however, the number of samples in the structuring element may be maintained constant, by sub-sampling the image and structuring element at the same time. The number of samples in the structuring element is preferably maintained at 64, layed out in an 8×8 pattern, and the distance between two samples in this pattern increases with increasing image sizes. This technique is equivalent to sub-sampling the image by a power of two and then using a structuring element of 8×8 pixels. That is, the technique may be interpreted, in one embodiment, as resizing the image to a fixed base size and always using the same densely packet 8×8 structuring element. The technique may be performed "in place" in software, that is, the sub-sampling of the image may be done implicitly by simply skipping sample during processing, while computing the color structure histogram. The sub-sampling factor and the spatial extent of the structuring element width and height can be computed at the same time as follows. Let E be the spatial extent of the structuring element size, i.e., the spatial extent is preferably E×E. Let K be the sub-sampling factor to be applied, where K=1 implies no sub-sampling, K=2 implies sub-sampling by 2 horizontally and vertically, etc. K and E are preferably computed as follows:

$$p = \max\{0, \text{round}(0.5 * \log_2(\text{width} * \text{height}) - 8)\} \text{ where } K = 2^p \text{ and } E = 8 * K$$

For example, an image of size 320×420 using the formula above will yield K=1 and E=8, in which case the structuring element is simply 8×8 with no sub-sampling performed as shown in FIG. 13A. An image with size 640×480 using the formula above will yield K=2 and E=16, in which case the spatial extent of the structuring element is 16×16 and sub-sampling is 2×2 as shown in FIG. 13B, which results in a structuring element with spatial extent of 8×8 on the sub-sampled image. Note, that images smaller than 256×256 are a special case in the sense that K=1 and E=8 in all cases. This avoids up-sampling smaller images to a bigger size and at the same time performs sufficiently well.

An implementation of the variable sized test area, illustrating the benefits, is described in ISO/IEC JTC 1/SC 29/WE 11M5785, Noordwijkerhout, the Netherlands, March 2000, incorporated by reference herein.

It is desirable to have available descriptors of different length, i.e., different numbers of "bins". As previously described, this corresponds to descriptor extraction in a color space that has been more coarsely or finely quantized. In general, a small descriptor corresponds to a more coarsely quantized color space. However, the color space may be quantized in any non-uniform manner, if desired. The different sized descriptors permits the particular system to select, at least in part, the storage requirements necessary for storing the color structure histograms. In addition, the selection of the size of the descriptors of the color structure histogram permits the system, at least in part, to determine the system's complexity and computational requirements. For example, with a limited number of images and nearly unlimited available storage, then a descriptor with a relatively large number of bins may be desirable. Where there is an unusually large number of images with limited additional available storage and limited computational resources, then a descriptor with a severely limited number of bins may be desirable. The available descriptors may be selected as desired, such as for example, 256, 200, 175, 130, 96, 75, 32, and 12. It is to be understood that multiple descriptor sizes may be used with any image descriptor system, including but not limited to color structure histograms.

Figure 14C:
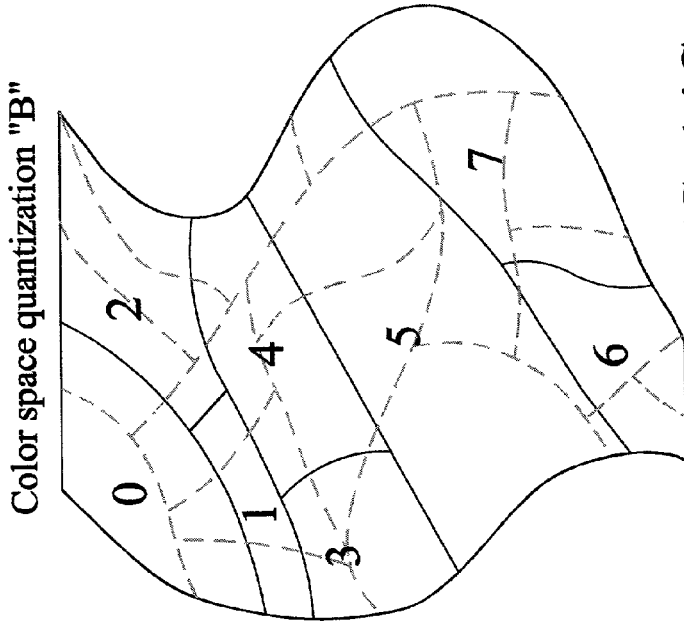
FIG. 14C illustrates a color space with quantization B.
Figure 14D:
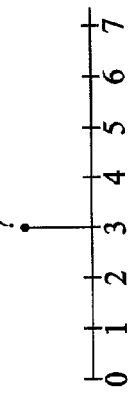
FIG. 14D illustrates a color structure histogram of FIG. 14C.
Figure 14A:
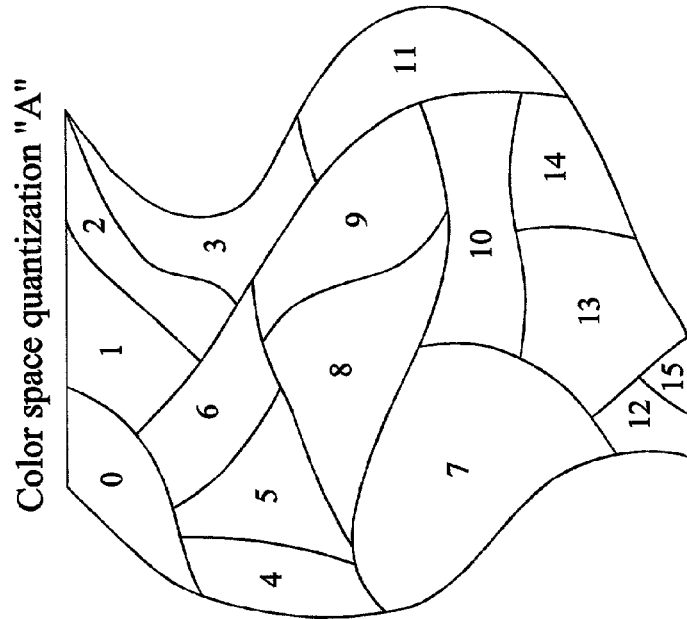
FIG. 14A illustrates a color space with quantization A.
Figure 14B:
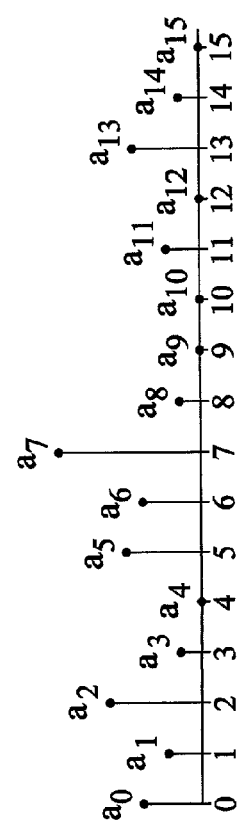
FIG. 14B illustrates a color structure histogram of FIG. 14A.

FIGS. 14A–F, describe the relationship between the quantized color space and the associated bin-layout along the independent axis of the color (or color structure) histogram descriptor. It also describes the relationship between two histograms derived from two different color space quantizations. A two dimensional color space divided into a small number of disjoint subsets, each encompassing a contiguous region of space, is shown in FIG. 14A for illustrative purposes only. In practice the dimensionality of the color space may be higher, typically being three and its shape may be arbitrary. Also in practice the number of subsets may be larger or smaller, their shape may be arbitrary, and the portions of space they contain may be highly disconnected, even consisting of one or more disconnected (discrete) points. To facilitate the discussion, these disjoint color space subsets shall be called "cells" although, as just mentioned, their shape and form may be arbitrary. FIG. 14A shows a particular quantization of the displayed color space which shall be denoted as "A" type quantization. By numbering the cells from 0 to N-1 where N (here N=16) is the total number of cells, and then numbering with the same numerals the bins of an N bin histogram, shown in FIG. 14B, a bijective relationship is established between the histogram bins and the color space cells. That is, each bin corresponds to one and only one cell and, conversely, each cell corresponds to one and only one bin. The assignment of the N numbers to both the color space cells and the histogram bins is arbitrary but in practice an orderly scheme such as that shown in FIGS. 14A–F is used. The value in a particular bin, say the kth bin, of the color structure histogram is determined, as discussed earlier, by the number of positions of the structuring element within the image that contain a color which is located within the kth bin is the number of times a pixel having a color in the kth cell occurs within the image.

FIG. 14C illustrates a re-quantization of the color space, which shall be denoted "B" type color space quantization. By re-quantization, it is meant that the color space is partitioned into a different set of cells, possibly but not necessarily a different number of cells. The independent axis of the histogram associated to FIG. 14C is shown FIG. 14D. FIG. 14A and FIG. 14C illustrate the case where there is little relationship between the quantization cells of a space and the cells of its re-quantization. If one is given the histogram of FIG. 14B and wishes to convert it into the histogram of FIG. 14D, for reasons of interoperability and without reference to the associated image itself, then the following difficulty arises. How, precisely, can the values in the histogram bins of FIG. 14B be combined to obtain bin values for FIG. 14D? Because of the bijective relationship between bins and color space cells, this equivalent to asking how to re-apportion the number of pixels that lie in the cells of the "B" quantization. The difficulty is illustrated by considering the cell of the "B" quantization whose index is 3. This cell contains portions of cells 4,5,7, and 8 from the "A" quantization shown in FIG. 14C by the dashed boundaries. Thus some portion of the number of pixels having a color lying in each of these "A" quantization cells should contribute to the value in bin 3 of the histogram of FIG. 14D corresponding to the "B" quantization. But without reference to the original image pixels this apportionment is difficult to determine.

The inventors conducted experiments to test various possible schemes by which to do this apportionment rationally. One idea was to apportion pixels having color in a given cell of "A" type quantization to a given cell of "B" type quantization in proportion to the area of the given "A" cell which overlaps the given "B" cell. Retrieval results from using this method to re-quantize descriptors were poor because the method does not (and cannot) take into account where in the given "A" quantization cell the pixel colors were originally located. The inventors realized that only in the case where cells from the "A" quantization lie completely inside or completely outside a cell of the re-quantized space could such an apportionment be made. For in that case, all or none, respectively, of the pixels in the given "A" quantization cell would, ipso facto, lie in the given cell of the re-quantized space.

Figure 14E:
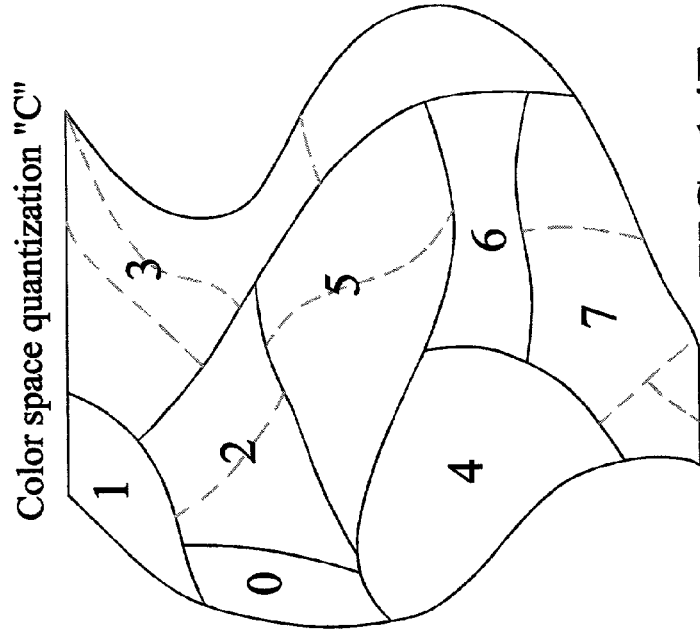
FIG. 14E illustrates a color space with quantization C.
Figure 14F:
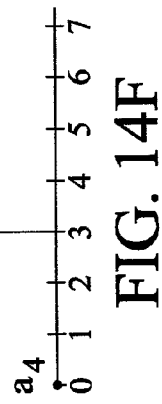
FIG. 14F illustrates a color structure histogram of FIG. 14E.

FIG. 14E shows a color space re-quantization of the "A" quantization which has this property. This denoted the "C" quantization of the color space. Observe that every "A" cell lies completely inside or outside of some "C" cell. Equivalently, every "C" cell boundary is an "A" cell boundary. With such a re-quantization of the color space the derivation of the "C" quantization histogram values from the "A" quantization histogram values may proceed. A preferred technique of derivation is to combine by addition the values of those "A" quantization histogram values may proceed. A preferred technique of derivation is to combine by addition the values of those "A" histogram bins which correspond to "A" cells that have been combined into "C" cells by re-quantization. FIG. 14F illustrates this for two "C" histogram bins, bin 0 and bin 3. Bin 0 of FIG. 14F corresponds to cell index 0 in FIG. 14E. This cell is the (trivial) combination of just one "A" quantization cell from FIG. 14A, namely the cell with index 4. Hence the value placed in bin 0 of FIG. 14F is derived solely from the value found in bin 4 of the "A" histogram of FIG. 14B.

As a non-trivial example, consider bin 3 of the "C" histogram of FIG. 14F. This corresponds to "C" cell index 3 of FIG. 14E which encompasses precisely cells 1,2,3, and 11 from the "A" color space quantization. Hence the values from the "A" histogram found in bins 1,2,3, and 11 are combined, preferably by addition, to obtain the derived value for bin 3 of the "C" histogram in FIG. 14F.

An exemplary example of how this re-quantization may be accomplished is described below for purposes of illustration. Let A be the color space quantization of a histogram and B be the target re-quantization. Let $I_A$ be a given color bin index in the A histogram. In HSV (hue-saturation-value) color space, for example, re-quantization may be performed by first mapping $I_A$ to $Hq_A$, $Sq_A$, and $Vq_A$, the quantization indices of the three HSV color components for the A type quantization. The mapping is defined by inverting the map that takes individual quantized color indices and delivers a histogram bin index. Next, the three color indices are de-quantized according to: $H=(Hq_A+0.5)/nHq_A$, where $nHq_A$ is the number of levels to which H was originally quantized in the A type and where H is a floating-point quantity. The same formula, with suitable changes, applies to S and V. Then $I_B$ is computed by re-quantizing H,S, and V, according to the quantization levels of the B type quantization and re-computing the histogram bin index, $I_B$, from $Hq_B$, $Sq_B$, and $Vq_B$. This defines a map form $I_A$ to $I_B$. The histogram amplitude index in $I_A$ is simply added to $I_B$. It can be shown that this is equivalent to adding the histogram amplitudes at $I_A$ and $I_B$.

While re-quantization may be applied to color histograms and color structure histograms, the present inventors came to the startling realization that this is not an optimal operation to perform when using the color structure histogram descriptors for image retrieval, as described below. In particular, this is not an optimal operation when the color structure histograms are extracted at different quantization levels and then subsequently re-quantized. The principal reason for this behavior is in the nature of the color structure histogram and is closely related to the reasons why color structure histograms normally out-perform the traditional histogram. Referring again to FIGS. 12A and 12B, they illustrate qualitatively, the behavior of the color structure histogram in the presence of two pathological but instructive types of color structures within an iso-color plane, the plane of pixels all having the same color. In FIG. 12A pixels of the same color, call it color P, are clumped together in a rectangular "blob". For the sake of description this clumpiness may be referred to as coherence. The more coherent an iso-color plane is, the more likely it is that groups of pixels within the iso-plane will be found close together. Conversely, the more incoherent the iso-color plane, the more its pixels will tend to be far apart, where "far apart" is with respect to the dimensions of the structuring element used for the color structure histogram.

The coherence of FIG. 12A, neglecting edge effects, contributes $(8+2)\times(7+2)=90$ counts to the (un-normalized) color structure histogram bin, the P-bin, that corresponds to color P. This is because a pixel of color P will be found within the structuring element at 90 different positions of the structuring element. On the other hand, the count for FIG. 12B will be, neglecting edge effects, $(8\times7)\times(3\times)=504$, because each pixel now contributes 9 total counts to the color structure histogram bin.

The corresponding traditional histogram will have 56 (un-normalized) counts in either case. Accordingly, the traditional histogram is blind to the incoherence of the color structure whereas the color structure histogram, in addition to measuring the amount of each color, is also sensitive to the incoherence within the iso-color plane. This additional information is the principal reason why the color structure histogram out-performs the traditional histogram. Likewise, the present inventors realized this is also principally why the color structure histogram can not be expected to perform well under re-quantization, as explained below.

Figure 15:
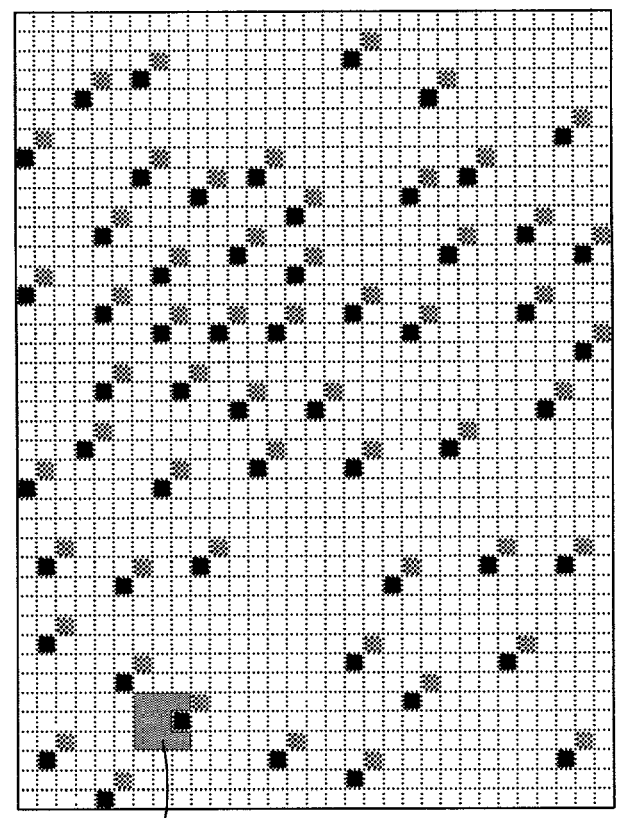
FIG. 15 illustrates an image with two iso-color planes, P and Q.

Referring to FIG. 15, let A again denote the initial color space quantization and B a coarser scalable re-quantization. A second color, Q, is introduced which has the following three properties: (i) its structure is also incoherent; (ii) its pixels are spatially near the pixels of color P; and (iii) its position in color space is near enough to color P that it will lie in the same quantization bin as P, cell PQ, when re-quantized. Color Q also contributes 504 counts to its respective improved histogram bin, the Q-bin. The corresponding traditional histogram again gets $(8\times7)=56$ counts in it Q-bin.

Presume, for purposes of illustration, that the color structure histogram and the traditional histogram are re-quantized. The P-bin and Q-bin become the new PQ-bin. For the traditional histogram the count in PG-bin is 112, the sum of counts in the P-bin and Q-bin, because that is how one does scalable re-quantization: a bin in the B quantization gets the contents of those bins in the A quantization that it contains. Notice that this is the same value that would be in the traditional histogram PQ-bin if the image had started out with B quantization. This is because a pixel in the B space has color PQ if and only if it had color P or color Q in the A quantized space. In other words, re-quantization for the traditional histogram is additive, (or, more properly, homomorphic) in the sense that combining two colors into one and then counting it is the same as individually counting the two colors and then adding the results.

Figure 16:
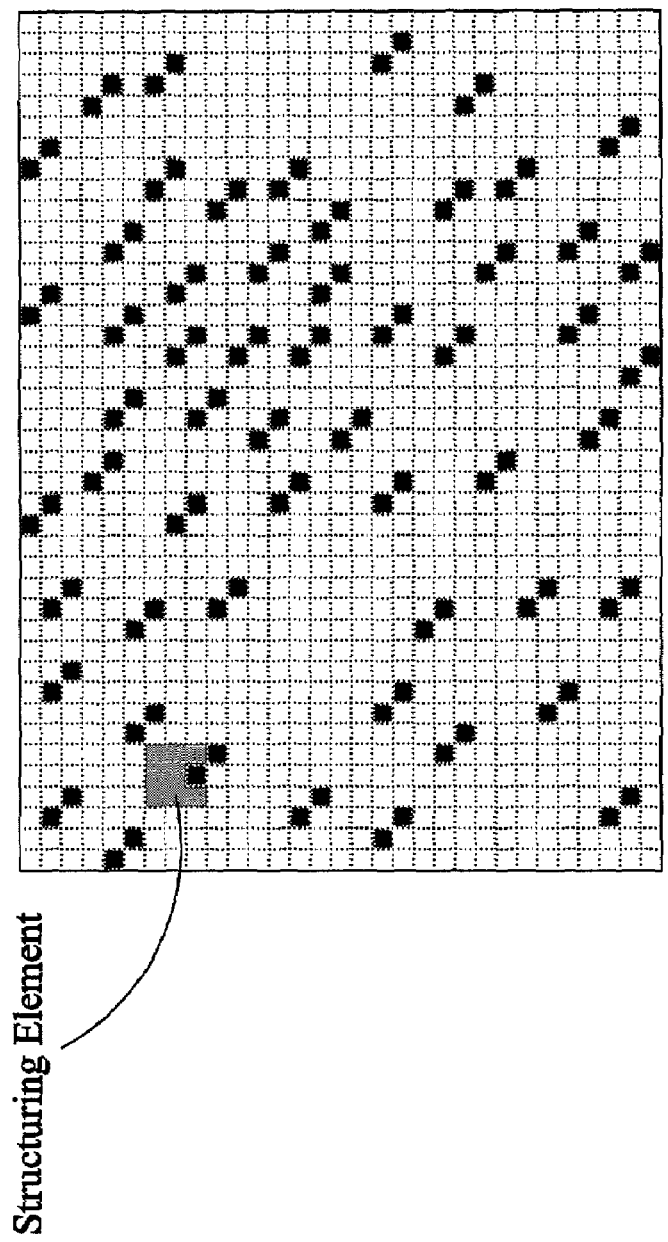
FIG. 16 illustrates an image with a single iso-color plane, PQ.

The behavior is quite different for the color structure histogram. When the color structure histogram is re-quantized, one adds the counts in all the bins that map to a given re-quantized bin just as with the traditional histogram. This is the best that one can do in the absence of knowledge of the structure of the associated iso-color plane. The result i 1008 counts. However, if the image starts out in the B quantized color space a very different result occurs. This can be observed in FIG. 16, where different color pixels have now become the same color. It may be observed that the incoherence of the iso-color plane is reduced in relation to FIG. 12B. Therefore, one can expect to get a lower count in the PQ-bin of the color structure histogram than resulted when re-quantizing the color structure histogram itself because re-quantizing can not take into account the color structure. In fact, the count would be 736 for FIG. 16, were the descriptor extracted from the image quantized in the B type color quantized space, given a 3×3 structuring element.

As a result, re-quantized color structure histograms are not homomorphic. A color structure histogram extracted from a B quantized image is significantly different with respect to the $l_1$ norm, from one that is re-quantized from A to B. Testing of the re-quantization of the color structure and traditional histograms is described in ISO/IEC JTC 1/SC 29/WG 11/M6018, Geneva, May 2000, incorporated by reference herein.

Figures 17, 18:
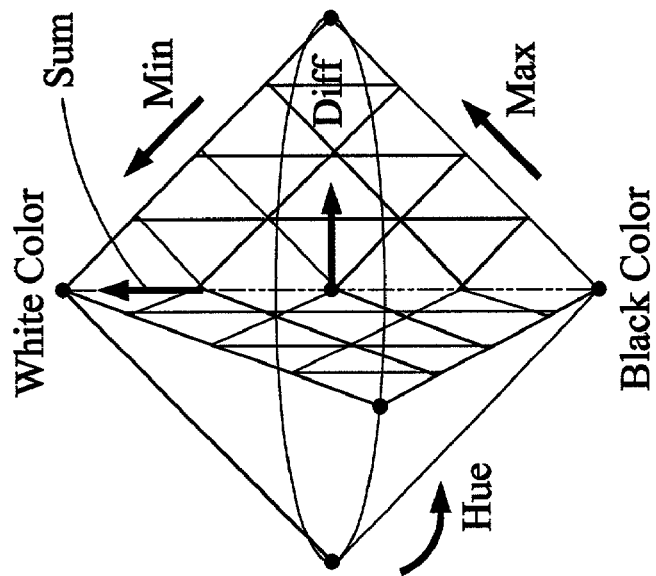
FIG. 17 shows an examplary data structure for colorQuant.
FIG. 18 shows a HMMD color space.

One of the attribute names within the MPEG-7 DDL definition of the descriptor presented earlier is colorQuant which specifies the color space, the color quantization operating point, and determines the number of ColorStructure values used in the DDL representation syntax. Its semantics may be specified as illustrated in FIG. 17. The variable, colorQuant, may take on suitable values, for example, 001, 010, 011, and 100. The values field contains the ColorStructure descriptor data which is organized in an M element array of 8-bit inter values, h(m) for m∈{0, 1, . . . , M-1}. The number, M, of bins may be chosen from the set {256, 128, 64, 32} of allowable operating points. The bins of an M-bin descriptor are associated bijectively to the M quantized colors, $c_0, c_1, c_2, \ldots, c_{m-1}$, of the M-cell color space, which is defined later. The value of h(m) represents, in a non-linear manner to be described, the number of structuring elements in the image the image that contain one or more pixels with color $c_m$.

It is to be understood that any color space may be used, as desired. However, for purposes of completeness the preferred color space is referred to as "HMMD". The HMMD color space is defined by a non-linear, reversible transformation from the RGB color space. There are five distinct attributes (components) in the HMMD color space. The semantics of the five attributes are defined as follows:

Hue: Hue;
Max: max(R,G,B); indicates how much black color the image has, giving the flavor of shade or blackness;
Min: min(R,G,B); indicates how much white color the image has, giving the flavor of tint or whiteness;
Diff: Max-Min; indicates how much gray the image contains and how close to the pure color, giving the flavor of tone or colorfulness;
Sum: (Max+Min)/2; and simulates the brightness of the color.

Referring to FIG. 18, the HMMD color space has a double cone appearance consisting of blackness, whiteness, colorfulness, and hue. A selection of available color spaces may be ordered in any desired sequence, such as the sequence shown in FIG. 19. The available color spaces may be further represented as a binary value, if desired, such as the binary representation shown in FIG. 20.

Normally the image descriptors are extracted and compared in a common color space. It is considerably more difficult to compare image descriptors that are derived from different color spaces.

Figure 21:
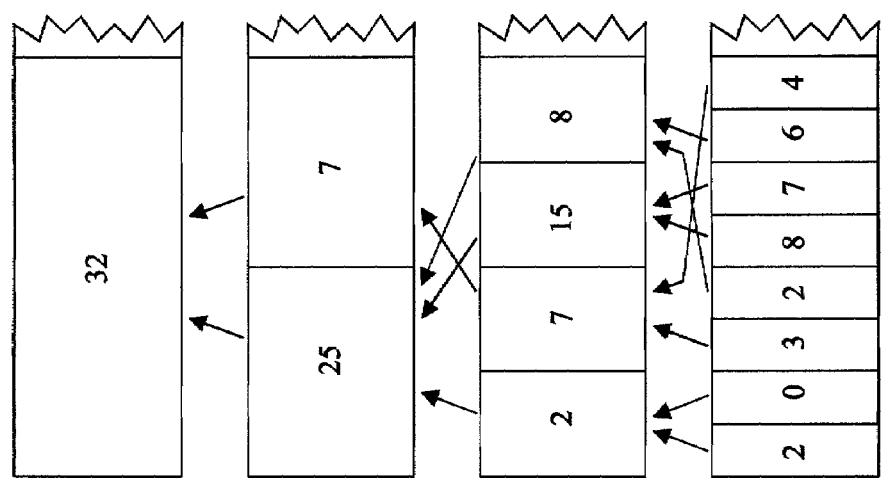
FIG. 21 illustrates one example of bin unification.

In light of the realization that is not optimal to re-quantize color structure descriptors for comparison with one another, the present inventors determined that the color structure histogram should always be initially extracted from the image at the finest quantization granularity, such as 256 levels. Referring to FIG. 21, after extraction at the finest quantization the descriptor may be re-quantized by combining appropriate bins, such as by simple summation. In this manner the other levels, such as 128, 64, and 32 may be determined in a consistent and uniform manner which is independent of the color coherence of the image.

Figure 22:
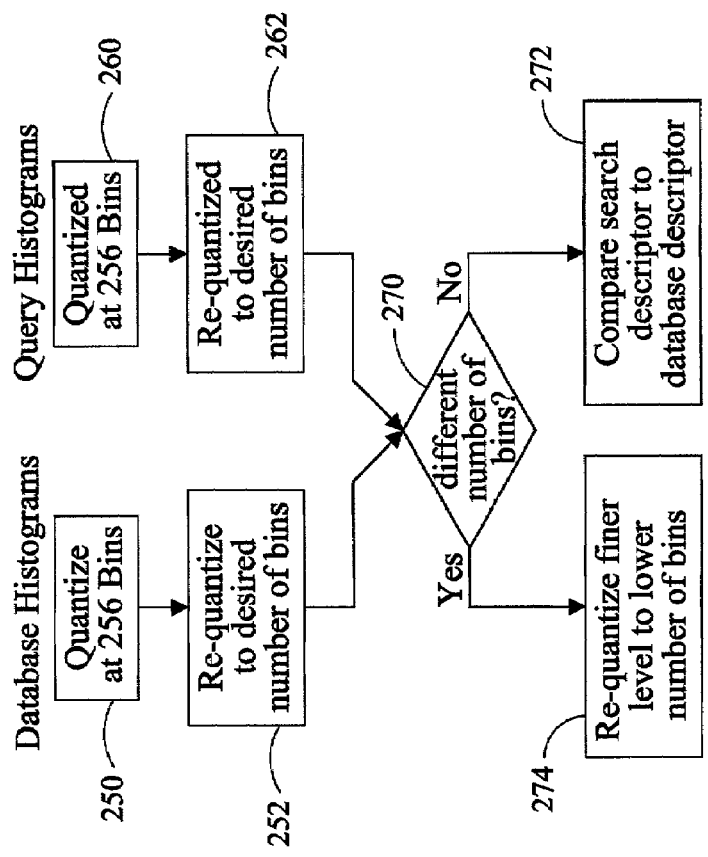
FIG. 22 illustrates a technique for re-quantization and comparison.

Reference to FIG. 22, the database of color structure histograms are created by initially quantizing each image at the highest quantization level, such as 256 bins, at block 250. The quantized images as a result of block 250 are then re-quantized to the desired number of bins, such as 128, 64, and 32, at block 252. The search query is initially quantized at the highest quantization level, such as 256 bins, at block 260. The quantized image as a result of block 260 is then quantized to the desired number of bins, such as 128, 64, and 32, at block 262. The quantized images as a result of blocks 250 and 260 need not be re-quantized, if desired. Block 270 determines if the query descriptor is quantized at a different level than the particular histogram descriptor. If the two descriptors have the same number of bins then the descriptors are compared, at block 272. If the two descriptors have a different number of bins then the descriptor is re-quantized to match the quantization of the other descriptor, at block 274 prior to comparison. The descriptors may both be re-quantized to the same number of bins, if desired. The re-quantized descriptors, now being at the same size, are compared at block 272. With each color structure histogram being quantized to the same size, in the same manner, the color structure histograms will be consistent with one another and accordingly the spatial information contained therein will be uniformly treated.

Figure 24:
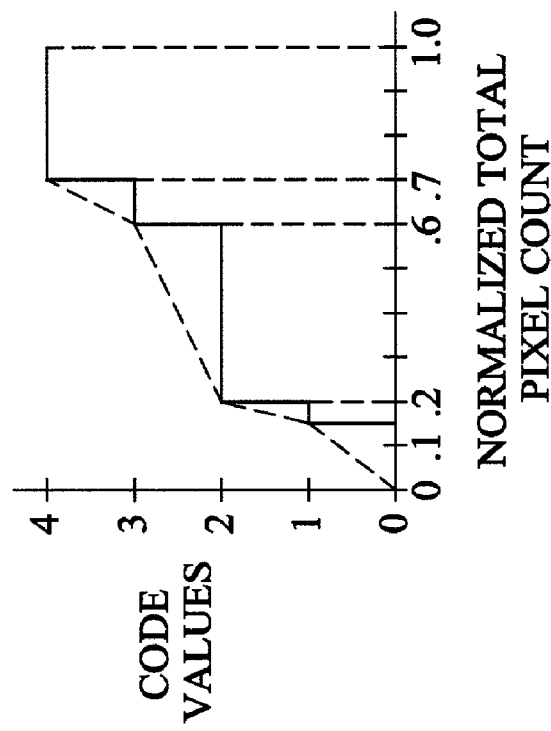
FIG. 24 illustrates non-linear pixel count versus code values.
Figure 23:
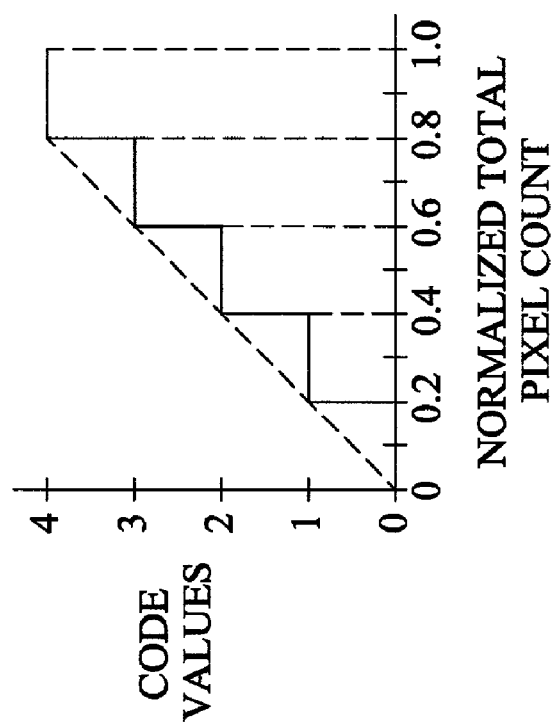
FIG. 23 illustrates linear pixel count versus code values.

After further consideration of a histogram including spatial information, especially when each quantized color is merely counted once for each test area, a significant number of the bins contain relatively small numbers. To further reduce the storage requirements for the histogram, the bin amplitudes are quantized into a selected set of code values. For a color structure histogram the maximum value that any particular bin amplitude may obtain is a predefined number, namely, $(N-S_X+1) \times (M-S_y+1)$, where N is the horizontal width of the structuring element in pixels, M is the vertical height of the structuring element in pixels, $S_x$ is the vertical height of the structuring element in pixels. It is noted that this maximum value is the same as the traditional color histogram, where $S_x=S_y=1$. With the maximum potential value being known, the resulting histogram may be normalized in a well defined manner. Referring to FIG. 23, an example of an inter-relationship between the normalized total pixel count and the resulting code values is shown. Traditionally, the pixel count is uniformly quantized which includes a linear relationship between code values and quantized amplitudes, as shown by the diagonal dotted line in FIG. 24. Referring to FIG. 24, another example of an inter-relationship between the normalized pixel count having a non-linear relationship to code values. This is an example of non-uniform quantization.

Most of the data within typical color structure histograms are small numbers plus a few large numbers, such as illustrated by FIG. 11. When comparing two histograms comprised mostly of small numbers, typically by the absolute difference of one histogram from another, the result will primarily be smaller numbers. This decrease in the apparent differences between the small numbers is further decreased by subsequent amplitude quantization, if performed. Accordingly, the remaining few large numbers will tend to dominate the comparison between two color structure histograms. To compensate for the tendency of large code values (i.e., large numbers) to dominate while small code values (i.e., small numbers) become nearly irrelevant, the present inventors determined that the amplitudes should be non-uniformly quantized which induces a non-linear relationship between amplitudes and code values. An exemplary distribution of the different code values may divide the bin amplitude range into six regions, and subsequently allocate a different number of quantization levels uniformly within each region. The thresholds to divide the bin amplitude range (between 0.0 and 1.0) into 6 regions are (or approximately):

| Th0 | 0.000000001; (or a number significantly smaller than 0.037 or substantially equal to zero) |
| Th1 | 0.037; |
| Th2 | 0.080; |
| Th3 | 0.195; and |
| Th4 | 0.320. |

The number of quantization levels (or code values) allocated to each region are (or approximately):

| N0 = 1 | between 0.0 and Th0; |
| N1 = 25 | between Th0 and Th1; |
| N2 = 20 | between Th1 and Th2; |
| N3 = 35 | between Th2 and Th3; |
| N4 = 35 | between Th3 and Th4; and |
| N5 = 140 | between Th4 and 1.0. |

The threshold values may be modified, as desire.

In contrast to the traditional wisdom of uniformly quantizing the bin amplitudes, the improved technique uses a non-uniform amplitude quantization technique. An implementation of the non-uniform quantization of amplitudes is described in ISO/IEC JTC 1/SC 29/WE 11/M5218, Beijing, July 2000, incorporated by reference herein.

Figure 25:
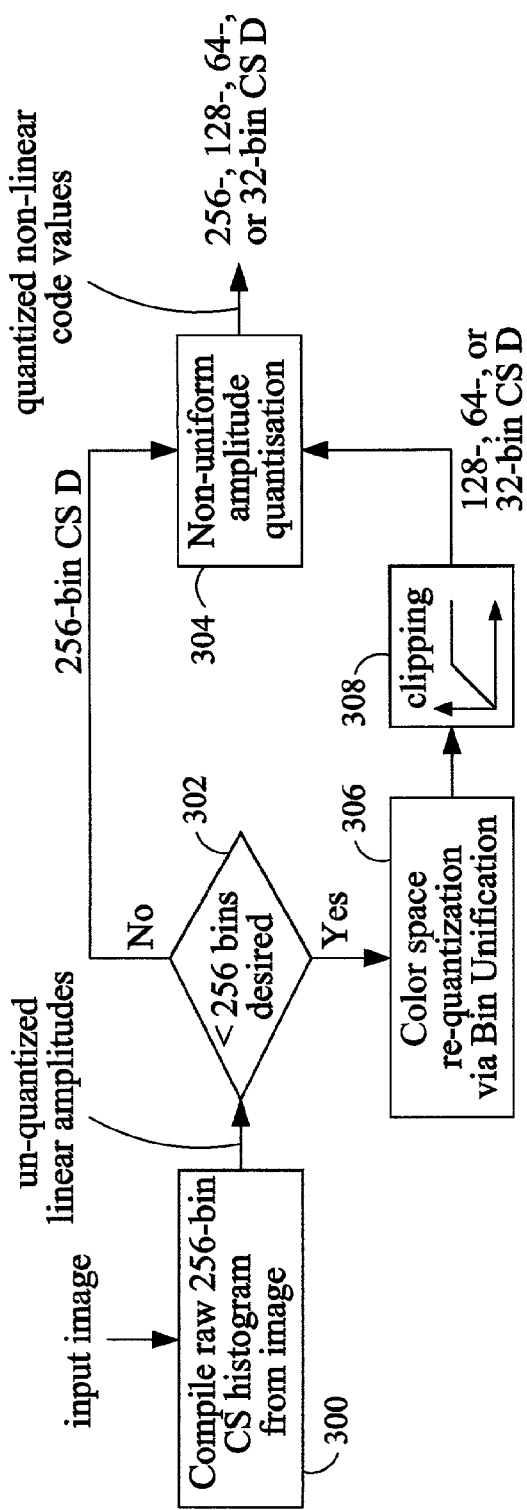
FIG. 25 illustrates one exemplary implementation of a color structure histogram descriptor extraction process.

Referring to FIG. 25, one exemplary implementation of a color structure histogram descriptor extraction process is shown. A "raw" 256-bin histogram is accumulated (e.g., compiled) directly from the image, at block 300. At this point, bin amplitudes are un-quantized and reside in the "linear" domain, i.e., linearly related to the number of structuring elements that contain the color associated with the bin. If 256 bins are desired then block 302 branches to block 304 which non-uniformly quantizes the amplitude of the bins, such as using the techniques previously described. If less than 256 bins are desired then block 302 branches to block 306 which re-quantizes the color space by bin unification, such as using the techniques previously described. The result of bin unification at block 306 is still in the "linear" domain. The results of block 306 are clipped at block 308 to a maximum amplitude, which avoids integer "rollover" if a limited number of bits are used. The result of clipping by block 308 is provided to block 304 which non-uniformly quantizes the amplitude of the bins. The result of block 304 non-uniform amplitude quantization, which provides code values which are non-linearly related to the number of structuring elements that contain the color associated with the bin. After considerable analysis, the present inventors determined that the re-quantization via bin unification in the "linear" domain provides increased retrieval performance over bin unification in the "non-linear" domain using code values. This increased performance, the present inventors determined, is primarily the result of decreased clipping.

Figure 26:
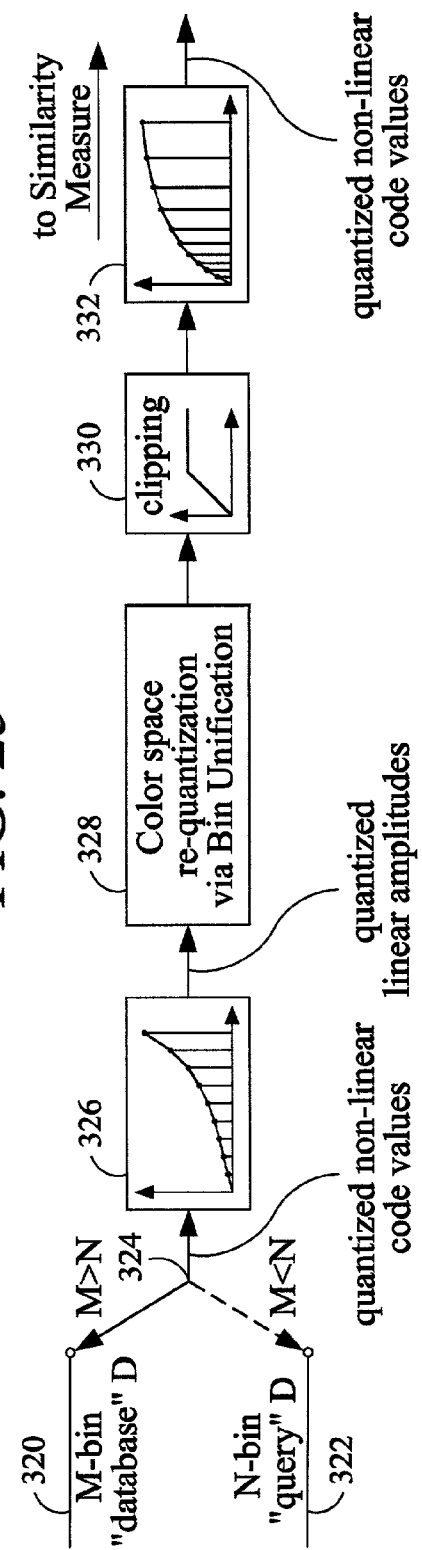
FIG. 26 illustrates one exemplary comparison for a query and a database descriptor.

Referring to FIG. 26, when a query and a database descriptor are presented for comparison to a similarity measure their sizes must agree. Given a database descriptor of size M 320 and a query descriptor of size N 322, the larger of the two descriptors is reduced in size to match the smaller of the two. The code values of the descriptor to be reduced are first converted to (quantized) linear amplitudes at block 326. The conversion of code values to linear amplitudes normally have the following properties: (i) there is a linear relationship between the resultant amplitudes and the mid-interval values of the non-uniform quantization intervals within [0,1] defined previously, and (ii) these linear amplitude mid-interval values are represented by B bits, where B is preferably 20. The bin unification is performed at block 328. In particular, if it is assumed that M>N, then the mapping of the bins in the M-bin descriptor to the bins in the N-bin descriptor is defined by re-quantizing the color represented by each bin of the M-bin descriptor into the N-cell color space, and then computing the bin index that represents each re-quantized color. The result of block 326 is a descriptor with non-uniform amplitude quantization. During bin unification the sum of two bins are preferably clipped at block 330 to the maximum possible linear amplitude, $2^B-1$. Then, the linear amplitudes of the reduced descriptor are converted back to non-linear code values.

Figure 27:
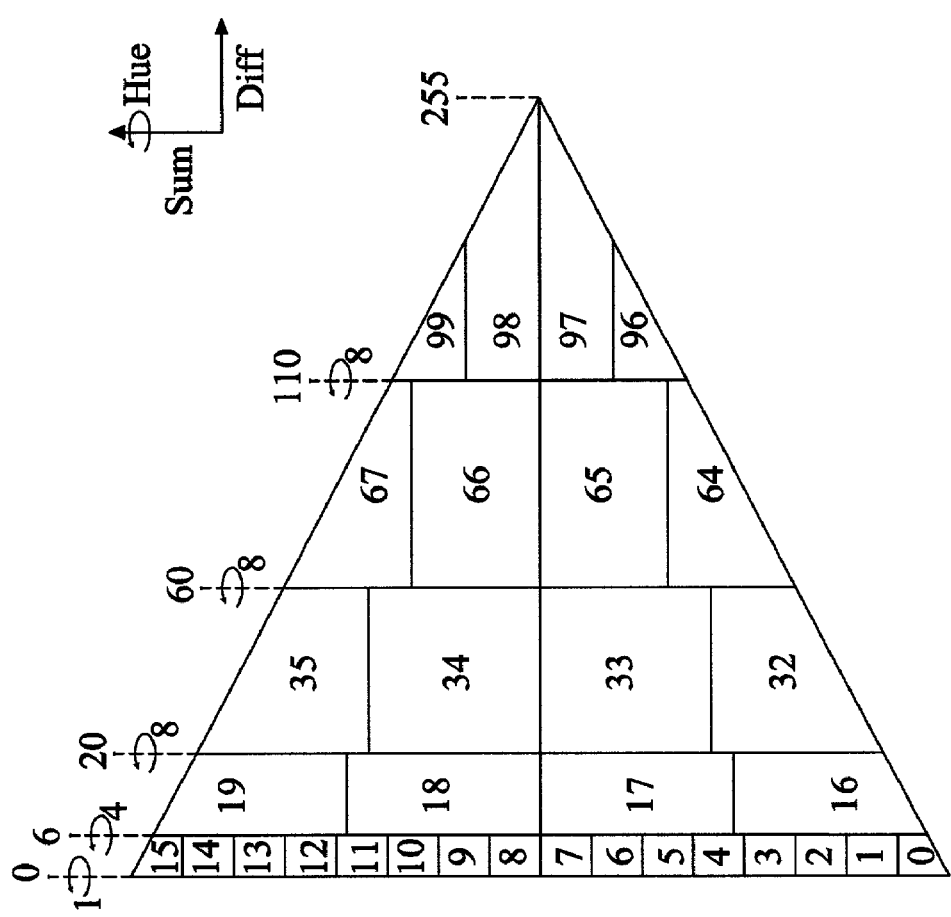
FIG. 27 illustrates an exemplary HMMD color space quantization.

FIG. 27 shows a slice of the HMMD space in the diff-sum plane for zero hue angel and depicts the quantization cells for the 128-cell operating point. Cut-points defining the subspaces are indicated in the figure by vertical lines in the color plane. The diff-axis values that determine the cut-points are shown in black at the top of the dashed cut-point markers along the upper edge of the plane. Horizontal lines within each subspace depict the quantization along the sum-axis. The quantization of hue angle is indicated by the gray rotation arrows around each cut-point marker. The gray number to the right of a rotation angle corresponds to the number of levels to which hue has been quantized in the subspace to the right of the cut-point. For example, FIG. 14 states that the hue values associated with the subspace between diff=60 and diff=110 (i.e. subspace 3) are quantized to 8 levels. This agrees with the entry in Table 15.

The bijective mapping between color-space cells and descriptor bin indices is given explicitly by the numbers within the cells. The ordering of these numbers is firsts from bottom to top (parallel to the sum-axis), then from diff-sum plane to diff-sum plane (around the hue-axis) staying within a subspace, and finally from subspace to subspace. For example, the cells of FIG. 14 closest to the bottom edge in subspaces 2 and 3 are numbered 32 and 64. The jump is due to the fact that there are four sum levels and 8 hue levels for this subspace. The numbers within the subspace, therefore, increase from 32 to 32 +4*8−1=63.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A method for describing an image comprising the steps of:
    (a) defining a spatial structural element including a plurality of picture elements;
    (b) delineating on said image a plurality of test areas corresponding to said spatial structural element; and
    (c) quantifying a plurality of colors of each of said test areas, where said quantifying of said plurality of colors for each of said test areas is independent of the number of each of said quantified colors in each of said respective test areas.

2. The method claim 1 wherein said quantifying of said plurality of colors for each of said test areas is independent of the number of pixels within each of said test areas that have the same quantified color.

3. The method of claim 1 wherein said quantifying quantizes said plurality of colors accordingly to a plurality of quantized color regions, where each of said quantized color regions includes a plurality of colors of the color space of said image.

4. The method of claim 1 wherein the color space of said image is quantized into a plurality of quantized color regions and said plurality of colors of each of said test areas are quantified in accordance with said quantized color regions.

5. The method claim 4 wherein said quantifying of said plurality of colors of each of said test areas provides a one-dimensional histogram.

6. The method of claim 1 where the size of the said spatial structural element is selected in accordance with the size of said image.

7. A method for describing an image comprising the steps of:
    (a) defining a spatial structural element including a plurality of picture elements, where the size of said spatial structural element is selected in accordance with the size of said image;
    (b) delineating on said image a plurality of test areas corresponding to said spatial structural element; and
    (c) quantifying a plurality of colors of each of said tests areas.

8. The method claim 7 wherein said spatial structural element is a first element size when said image is a first image size, said spatial structural element is a second element size when said image is a second image size, wherein said first element size is smaller than said second element size and said first image size is smaller than said second image size.

9. The method of claim 8 where said quantifying of said plurality of colors for each of said test areas is independent of the number of each of the quantified colors in each of said respective test areas.

10. The method of claim 7 wherein said quantifying of said plurality of colors for each of said test areas is independent of the number of pixels within each of said test areas that have the same quantized color.

11. The method of claim 7 wherein said quantifying quantizes said plurality of colors accordingly to a plurality of quantized color regions, where each of said quantized color regions includes a plurality of colors of the color space of said image.

12. The method of claim 7 wherein the color space of said image is quantized into a plurality of quantized color regions and said plurality of colors of each of said test areas are quantified in accordance with said quantized color regions.

13. The method of claim 7 wherein said quantifying of said plurality of colors of each of said test areas provides a one-dimensional histogram.

14. The method of claim 7 wherein said spatial structural element is 8×8.

15. The method of claim 14 wherein said 8×8 includes 64 samples.

16. The method of claim 7 wherein said spatial structural element is maintained at a predetermined size and said image is sub-sampled to determine said test areas corresponding to said spatial structural element.

17. The method of claim 16 wherein said sub-sampling is performed implicitly.

18. The method of claim 7 wherein
    p=max }0,round (05.*log$_2$(width*height)−8)}where
    width is the width of the image;
    height is the height of the image;
    K is the sub-sampling factor applied to said image, K=2$^P$
    E is the spatial extent of said spatial structural element, E=8*K.

19. A method for comparing a first image to a second image comprising the steps of:
    (a) defining a first spatial structural element including a plurality of picture elements;
    (b) delineating on said first image a plurality of first test areas corresponding to said first spatial structural element;
    (c) quantizing a first plurality of colors of each of said first test areas;
    (d) re-quantizing said quantifying of step (c) to a different quantization level;
    (e) defining a second spatial structural element including a plurality of picture elements;
    (f) delineating on said second image a plurality of second test areas corresponding to said second spatial structural element;
    (g) quantizing a second plurality of colors of each of said second test areas;
    (h) re-quantizing said quantizing of step (g) to said different quantization level; and
    (i) comparing said re-quantizing of step (d) with said re-quantifing of step (h).

20. The method of claim 19 wherein said quantizing said first plurality of colors results in a first descriptor having a first number of bins and said quantizing said second plurality of colors results in a second descriptor having a second number of bins.

21. The method of claim 20 wherein said first number of bins and said second number of bins are equal.

22. The method of claim 20 wherein said first number of bins and the number of bins of said different quantization level are equal.

23. The method of claim 20 wherein said second number of bins and the number of bins of said different quantization level are equal.

24. The method of claim 19 wherein said re-quantizing includes a proper refinement.

* * * * *

UNITED STATES PATENT AND TRADEMARK OFFICE
CERTIFICATE OF CORRECTION

PATENT NO. : 7,062,084 B2
APPLICATION NO. : 09/729470
DATED : June 13, 2006
INVENTOR(S) : Dean Messing et al.

It is certified that error appears in the above-identified patent and that said Letters Patent is hereby corrected as shown below:

Col. 19, line 59
Change "tests" to --test--.

Col. 20, line 32
Change "}0,round (05.*log$_2$(width*height)-8)}" to --{0,round (0.5*log$_2$(width*height)-8)}--.

Col. 20, line 60
Change "re-quantifing" to --re-quantifying--.

Signed and Sealed this

Eighth Day of July, 2008

JON W. DUDAS
*Director of the United States Patent and Trademark Office*